United States Patent
Shriyan et al.

(10) Patent No.: US 12,215,788 B2
(45) Date of Patent: Feb. 4, 2025

(54) DYNAMIC ROTARY SHAFT SEAL FOR MIXING APPARATUS

(71) Applicant: Cinchseal Associates, Inc., Cherry Hill, NJ (US)

(72) Inventors: Vipul Shriyan, Maple Shade, NJ (US); David Verbaro, Monroe, NJ (US); Saji Pillai, Collegeville, PA (US)

(73) Assignee: CINCHSEAL ASSOCIATES, INC., Mt. Laurel, NJ (US)

( * ) Notice: Subject to any disclaimer, the term of this patent is extended or adjusted under 35 U.S.C. 154(b) by 0 days.

(21) Appl. No.: 18/370,510

(22) Filed: Sep. 20, 2023

(65) Prior Publication Data

US 2024/0093785 A1 Mar. 21, 2024

Related U.S. Application Data

(60) Provisional application No. 63/408,173, filed on Sep. 20, 2022.

(51) Int. Cl.
*F16J 15/36* (2006.01)

(52) U.S. Cl.
CPC ..................... *F16J 15/36* (2013.01)

(58) Field of Classification Search
CPC ........................................... F16J 15/36
See application file for complete search history.

(56) References Cited

U.S. PATENT DOCUMENTS

| | | |
|---|---|---|
| 2,189,686 A | 2/1940 | Stevenson |
| 2,367,403 A | 1/1945 | Kosatka |
| 2,939,730 A * | 6/1960 | Turpin ............ F16J 15/36 277/389 |
| 4,809,992 A | 3/1989 | Kemp, Jr. et al. |
| 4,822,056 A | 4/1989 | Bowers |
| 4,854,743 A * | 8/1989 | Sexton .......... F16J 15/3464 384/150 |

(Continued)

FOREIGN PATENT DOCUMENTS

| | | |
|---|---|---|
| GB | 1372904 A | 11/1974 |
| JP | S57195968 A | 12/1982 |

OTHER PUBLICATIONS

Woodex Bearing Company, Inc., Meco Engineered Shaft Seals, Meco OFS Type 2 Brochure, Aug. 10, 2022.

(Continued)

*Primary Examiner* — Vishal A Patel
(74) *Attorney, Agent, or Firm* — Panitch Schwarze Belisario & Nadel LLP

(57) ABSTRACT

A seal for sealing a gap between rotatable shaft and a vessel wall includes an adapter plate fixed to the vessel wall. A stator plate is attached to the adapter plate. An interfacing boot rotates with the rotatable shaft and has a lip in sliding contact with the stator plate. A central boot is sealingly engaged with and rotates with the rotatable shaft. A drive ring rotates with and is axially movable with respect to the rotating shaft. An anchor ring is fixable non-rotatably and axially to the rotatable shaft. A bias member urges the anchor ring and the drive ring apart. A compression member compresses the bias member, and upon release the bias member urges the drive ring forwardly from the anchor ring. A sealing method includes steps for assembling the seal.

24 Claims, 11 Drawing Sheets

(56) References Cited

U.S. PATENT DOCUMENTS

| | | | |
|---|---|---|---|
| 5,000,462 A | * | 3/1991 | Trozzi .................... B02C 17/18 |
| | | | 241/179 |
| 5,409,241 A | | 4/1995 | Bowers |
| 6,305,693 B1 | | 10/2001 | Wehrle |
| 7,178,806 B1 | | 2/2007 | Pitchko et al. |
| 11,035,473 B2 | | 6/2021 | Pillai |
| 2023/0258266 A1 | | 8/2023 | Mncent et al. |

OTHER PUBLICATIONS

Woodex Bearing Company, Inc., Meco Engineered Shaft Seals, Meco OFS Type 1 Brochure, Aug. 10, 2022.

* cited by examiner

DYNAMIC ROTARY SHAFT SEAL FOR MIXING APPARATUS

CROSS-REFERENCE TO RELATED APPLICATION

This application claims priority from U.S. Provisional Patent Application No. 63/408,173 filed Sep. 20, 2022, the entire contents of which are incorporated by reference herein.

BACKGROUND OF THE INVENTION

The present invention relates to a seal for a mixing apparatus and more particularly to a seal for sealing a gap surrounding a rotatable shaft where the rotatable shaft penetrates a wall of a mixing apparatus or other vessel.

Advanced mixing equipment is required for the manufacturing process in a wide variety of industries, such as food processing, cement production, and pharmaceutical production. In order to avoid loss of material during processing, seals are placed between the rotatable and stationary portions of such equipment. The use of seals reduces material loss and contamination while contributing to environmental safety for plant employees.

Conventional seals have several drawbacks. For example, conventional seals cannot take or adjust to a large deviation from true circular, axial rotation; such deviation is sometimes called "runout." Further, conventional seals may not form a continuous barrier, may provide gaps through which material may escape, and may require frequent maintenance to achieve acceptable performance. Further, seals often wear over time, resulting in premature replacement or requiring regular adjustment to compensate for wear.

A dynamic rotary shaft seal according to an embodiment of the present invention may provide an effective, continuous, reduced-maintenance seal for a mixing application in which a rotatable shaft penetrates a wall of a mixing apparatus or other vessel.

BRIEF SUMMARY OF THE DISCLOSURE

Briefly stated, one aspect of the present disclosure is directed to a seal for sealing a gap between rotatable shaft and a vessel wall where the rotatable shaft penetrates the vessel wall. The rotatable shaft may have a central axis. The seal comprises an adapter plate adapted to be non-rotatably fixed with respect to the vessel wall, the adapter plate having a forward face oriented toward the vessel wall, a rearward face opposite the forward face, and a central bore alignable with the rotatable shaft. A stator plate may have a central bore, a forward face, and a rearward face, the stator plate being disposed rearwardly with respect to the adapter plate. An adapter-stator sealing member may be disposed between the adapter plate and the stator plate, the adapter-stator sealing member being non-rotatably attached with respect to the adapter plate. An interfacing boot may have a central bore alignable with the rotatable shaft, the interfacing boot being non-rotatably fixable with respect to the rotatable shaft to rotate therewith. The interfacing boot may be disposed rearwardly with respect to the stator plate and may have a forward face, a rearward face, and a lip extending circumferentially about the forward face of the interfacing boot, the lip encircling the central bore and protruding forwardly from the forward face of the interfacing boot. The lip may be in sliding contact with the stator plate when the rotatable shaft rotates. The lip may be configured so that the lip may be displaced by an axial misalignment of the rotatable shaft while the lip maintains contact with the stator plate. A central boot may have a forward face, a rearward face, and a central bore and may be sealingly engaged with the rotatable shaft and non-rotatably fixable to the rotatable shaft to prevent relative rotation with respect thereto. A drive ring may have a forward face, a rearward face, and a central bore and may be non-rotatably fixable with respect to the rotatable shaft to prevent relative rotation with respect thereto. The drive ring may be configured to urge the interfacing boot forwardly when the drive ring is urged forwardly. An anchor ring may have a forward face, a rearward face, and a central bore and may be non-rotatably fixable with respect to the rotatable shaft to prevent relative rotation with respect thereto. The anchor ring may be configured to be selectively axially movable and selectively axially fixable with respect to the rotatable shaft. The anchor ring being non-rotatably fixed to and selectively axially movable with respect to the drive ring. A bias member may be configured to urge the anchor ring and the drive ring axially apart. A compression member may be configured to be secured to compress the bias member and configured to be released so that the bias member urges the drive ring forwardly with respect to the anchor ring.

Another aspect of the present disclosure is directed to a method for installing a seal for sealing a gap between rotatable shaft and a vessel wall where the rotatable shaft penetrates the vessel wall. The method comprises: fixing an adapter plate non-rotatably with respect to the vessel wall, the adapter plate having a forward face oriented toward the vessel wall, a rearward face opposite the forward face, and a central bore alignable with the rotatable shaft; placing a stator plate with a central bore, a forward face, and a rearward face, the stator plate being placed rearwardly with respect to the adapter plate and mounting an adapter-stator sealing member between the rearward face of the adapter plate and the forward face of the stator plate; non-rotatably fixing an interfacing boot with respect to the rotatable shaft to rotate therewith, the interfacing boot having a central bore aligned with the rotatable shaft, the interfacing boot being disposed rearwardly with respect to the stator plate and having a forward face, a rearward face, and a lip extending circumferentially about the forward face of the interfacing boot, the lip encircling the central bore and protruding forwardly from the forward face of the interfacing boot, the lip being in sliding contact with the stator plate when the rotatable shaft rotates, and the lip configured so that the lip may be displaced by an axial misalignment of the rotatable shaft while the lip maintains contact with the stator plate; non-rotatably attaching a central boot with respect to the rotatable shaft to rotate therewith, the central boot having a forward face, a rearward face, and a central bore; attaching a drive ring to be axially movable and non-rotatable with respect to the rotatable shaft, the drive ring having a forward face, a rearward face, and a central bore, the rearward face of the drive ring being disposed rearwardly with respect to the rearward face of the central boot, and placing the drive ring so that third engagement features thereof, the third engagement features being configured to engage the drive ring non-rotatably with respect to the central boot, engage the second engaging features of the interfacing boot; the drive ring configured to bear urge the central boot forwardly when the drive ring is urged axially forwardly; attaching an anchor ring having a forward face, a rearward face, and a central bore to be non-rotatably fixed and axially movable with respect to the drive ring; operatively securing a bias member with respect to the anchor ring and the drive ring to urge the anchor ring and the drive ring axially apart; securing a compression member to compress the bias member so that upon release of the compression member, the bias member urges the drive ring and the anchor ring away from each other; placing the anchor ring and the drive ring on the rotatable shaft with the drive ring engaged with the central boot; and securing the anchor ring to be axially and non-rotatably fixed with respect to the rotatable shaft to prevent axial movement and relative rotation with respect to the rotatable shaft, and then releasing the compression member so that the compression member urges the drive ring forwardly with respect to the anchor ring.

Another aspect of the present disclosure is directed to a seal for sealing a gap between rotatable shaft and a vessel wall where the rotatable shaft penetrates the vessel wall. The seal comprises an adapter plate adapted to be non-rotatably fixed with respect to the vessel wall, the adapter plate having a forward face oriented toward the vessel wall, a rearward face opposite the forward face, and a central bore alignable with the rotatable shaft. An adapter-stator sealing member may be mounted to protrude rearwardly from the rearward face of the adapter plate. A stator plate may have a central bore, a forward face, and a rearward face, the stator plate being disposed rearwardly with respect to the adapter plate. The stator plate may be in contact with the adapter-stator sealing member protruding from the rearward face of the adapter plate, and the stator plate may be non-rotatably attached with respect to the adapter plate and attached in a manner permitting the stator plate to tilt angularly with respect to the adapter plate. An interfacing boot may have a central bore that may be alignable with and fittable to the rotatable shaft, the interfacing boot being non-rotatably fixable with respect to the rotatable shaft to rotate therewith. The interfacing boot being disposed rearwardly with respect to the stator plate and may have a forward face, a rearward face, and a lip extending circumferentially about the forward face of the interfacing boot, the lip encircling the central bore and protruding forwardly from the forward face of the interfacing boot. The lip may be in sliding contact with the stator plate when the rotatable shaft rotates. The lip being smaller radially than the stator plate so that the lip may be displaced by an axial misalignment of the rotatable shaft while the lip maintains contact with the stator plate. The interfacing boot may have a radial wall extending into the central bore. A central boot may have a forward face, a rearward face, and a central bore and may be non-rotatably fixable to the rotatable shaft to prevent relative rotation with respect thereto. The forward face of the central boot may be disposed rearwardly with respect to the radial wall of the interfacing boot. The central boot may have a plurality of first engagement features for engaging corresponding second engagement features of the interfacing boot. The first engagement features and the second engagement features may be configured to engage and thereby prevent relative rotation between the interfacing boot and the central boot while allowing relative axial movement between the interfacing boot and the central boot. The central boot may be configured so that the radial wall of the interfacing boot prevents the central boot from passing axially forwardly through the interfacing boot when the central boot moves axially with respect to the interfacing boot. A drive ring may have a forward face, a rearward face, and a central bore and may be non-rotatably fixable with respect to the rotatable shaft to prevent relative rotation with respect thereto. The rearward face of the drive ring may be disposed rearwardly with respect to the rearward face of the central boot. The drive ring may have third engagement features configured to engage the drive ring non-rotatably with respect to the central boot. The drive ring may have a radial wall configured to bear against the central boot to urge the central boot forwardly when the drive ring is urged axially forwardly. An anchor ring may have a forward face, a rearward face, and a central bore and may be non-rotatably fixable with respect to the rotatable shaft to prevent relative rotation with respect thereto. The anchor ring may be configured to be selectively axially movable and selectively axially fixable with respect to the rotatable shaft. The anchor ring further may be non-rotatably fixed and axially movable with respect to the drive ring. A bias member may be configured to urge the anchor ring and the drive ring axially apart. A compression member may be configured to be secured to compress the bias member and configured to be released so that the bias member urges the drive ring forwardly with respect to the anchor ring.

BRIEF DESCRIPTION OF THE SEVERAL VIEWS OF THE DRAWINGS

The following detailed description of the embodiments of the disclosure will be better understood when read in conjunction with the appended drawings. For the purpose of illustrating the invention, shown in the drawings is an embodiment which is presently preferred. It should be understood, however, that the invention is not limited to the precise arrangements and instrumentalities shown.

In the drawings.

DETAILED DESCRIPTION OF THE INVENTION

Figure 1:
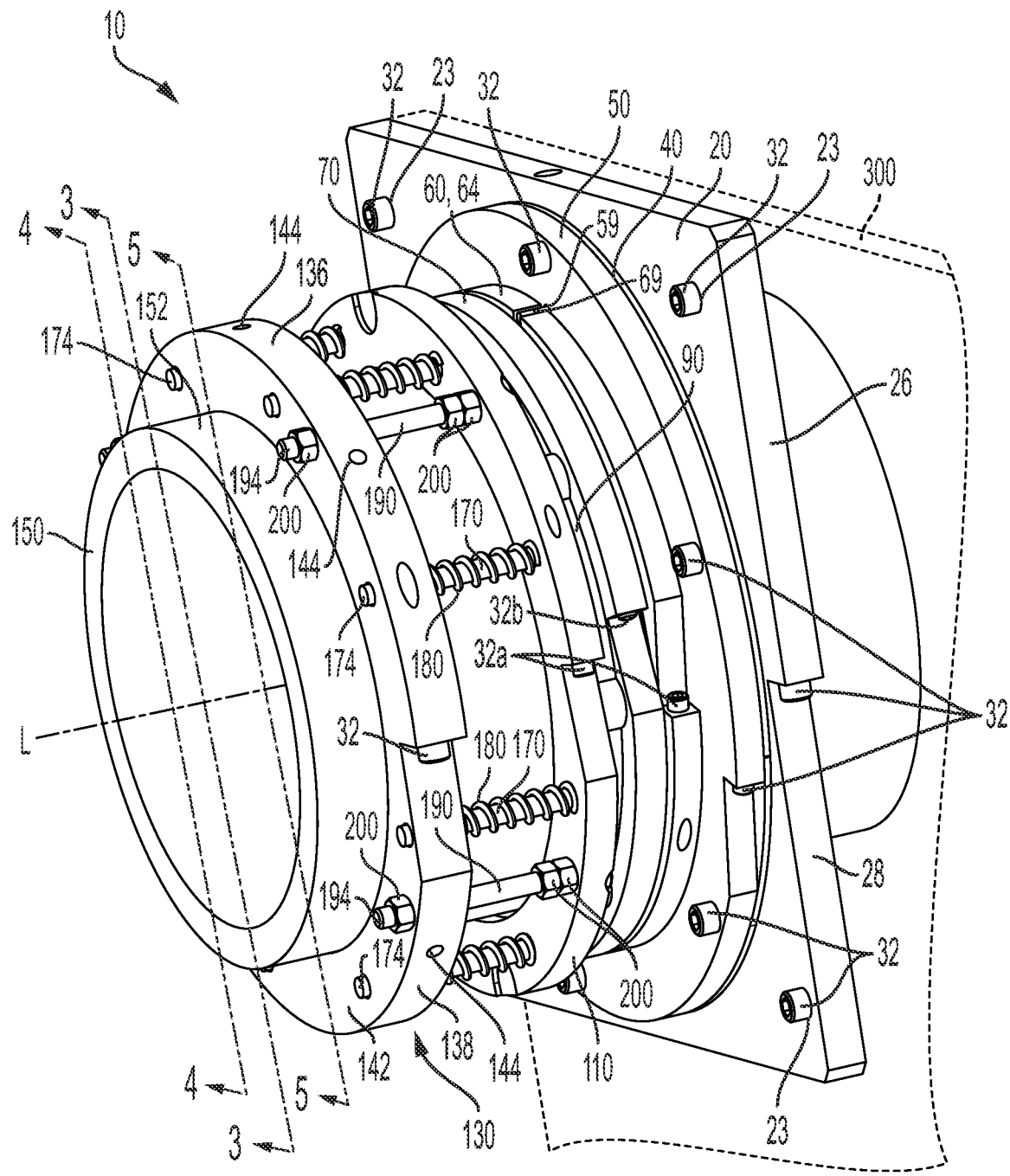
FIG. 1 is a back side perspective view of a preferred embodiment of a dynamic rotary shaft seal according to the present invention, shown in a mounted configuration on a shaft.
Figure 2:
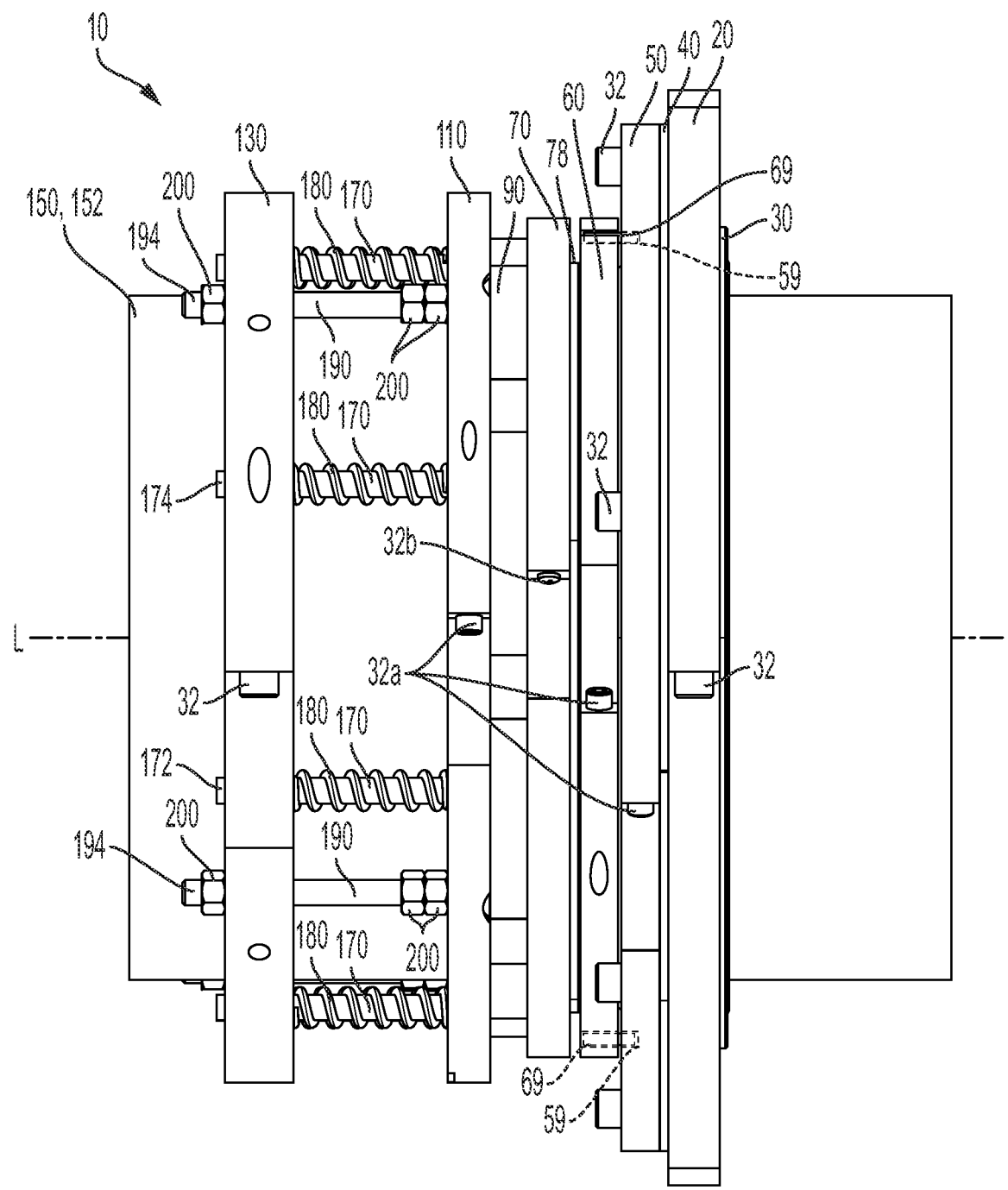
FIG. 2 is a side elevational view of the dynamic rotary shaft seal and shaft of FIG. 1.

Reference will now be made in detail to an embodiment of the invention, examples of which are illustrated in the accompanying drawings. The terminology used in the description of the invention herein is for the purpose of describing the particular embodiment only and is not intended to be limiting.

For reference in the drawings, "front" and "front end" and "forward" and "forwardly" refer to a direction toward the non-rotating end of the dynamic rotary shaft seal (generally to the right in the drawings); and "rear" and "rear" and "rearward" "rearwardly" refer to a direction away from the fixed, non-rotating end of the dynamic rotary shaft seal (generally to the left in the drawings). As may be seen from the drawings, the "front" of the seal is oriented toward the vessel wall, while the "rear" of the seal is oriented away from the vessel wall.

As used in the description of the invention, the singular forms "a" and "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used herein, specify the presence or the stated features, integers, steps, operations, elements, components, and/or groups, but do not preclude the presence or addition of one or more other features, integers, steps, operations, elements, components, and/or groups thereof.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The words "right," left," "lower," "upper," "front" and "rear" designate directions in the drawings to which reference is made. The words "inwardly" and "outwardly" refer to directions toward and away from, respectively, the geometric center of the seal, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first end could be termed a second end without departing from the scope of the present invention.

Referring to the drawings in detail, wherein like numerals indicate like elements throughout, in FIGS. 1-16, a preferred embodiment of a dynamic rotary shaft seal, generally designated 10, is shown.

Referring to FIG. 1, the dynamic rotary shaft seal 10 is shown in a mounted position with respect to a vessel wall 300, which typically is a strong metal wall of a tank, mixer, or other container. The vessel wall 300 is omitted in FIGS. 2-16. A rotatable shaft 150 is depicted as a cylinder having a central bore and defining a central, longitudinal axis L. The axis L may define an axial direction; other lines parallel to the axis L may likewise define axial directions. The rotatable shaft 150 may alternatively be a solid cylinder. The rotatable shaft 150 rotates when in use. The rotatable shaft 150 passes through the vessel wall 300. The dynamic rotary shaft seal 10 seals the rotatable shaft 150 when the rotatable shaft 150 is in use and rotating.

The dynamic rotary shaft seal 10 comprises both non-rotating portions and rotating portions; the rotating portions rotate with the rotatable shaft. Beginning at a forward position shown at the right of FIGS. 1-6 and 16, the dynamic rotary shaft seal 10 may include, within a non-rotating portion of the dynamic rotary shaft seal 10, a vessel-adapter plate 20. Alternatively, the vessel-adapter plate 20 and an optional gasket 40 (discussed below) may be omitted, and the adapter plate 50 may be attached directly to the vessel wall 300 instead of to the vessel-adapter plate 20.

The vessel-adapter plate 20 may be non-rotatably fixed to the vessel wall 300. In the illustrated embodiment, the vessel-adapter plate 20 includes a central bore 22 alignable with the rotatable shaft 150 and a seat 24 for accommodating a vessel-adapter sealing member, which in the illustrated embodiment takes the form of a first O-ring 30 disposed for forming a sealing interface between the vessel-adapter plate 20 and the vessel wall 300. The central bore 22 is alignable with and aligned with and sized to accommodate the rotatable shaft 150 and preferably is sized to fit closely about the rotatable shaft 150, while providing some clearance to accommodate runout (deviation from true circular, axial rotation of the rotatable shaft as defined above). An appropriate range of clearance may in some embodiments range from about 0.25 inch (6.4 mm) to 0.38 inch (9.5 mm). The vessel-adapter plate 20 may preferably be formed from a first partial plate 26 and a second partial plate 28 to allow the vessel-adapter plate 20 to be removed and replaced or reinstalled with the rotatable shaft 150 remaining in place passing through the vessel wall 300. The first partial plate 26 may be secured to the second partial plate 28 by threaded connectors such as screws 32 (FIG. 1). The vessel-adapter plate 20 may be non-rotatably and axially fixed to the vessel wall 300 by a plurality of screws 32 passing through mounting apertures 23 (FIGS. 1 and 16) in the vessel-adapter plate 20 and engaging the vessel wall 300. The vessel-adapter plate 20 also may have secondary mounting apertures 25 for screws 32 engaging other non-rotating components (described below) of the dynamic rotary shaft seal 10. The other non-rotating components may non-rotatably fixed to with respect to the vessel wall 300 directly or indirectly, by being fixed to the vessel-adapter plate 20 or to another non-rotating component. The vessel-adapter plate 20 is formed of a sturdy material sufficiently strong and having other properties, such as corrosion resistance, required for the application, as known in the art. Stainless steel is a suitable material for this component.

Figure 16:
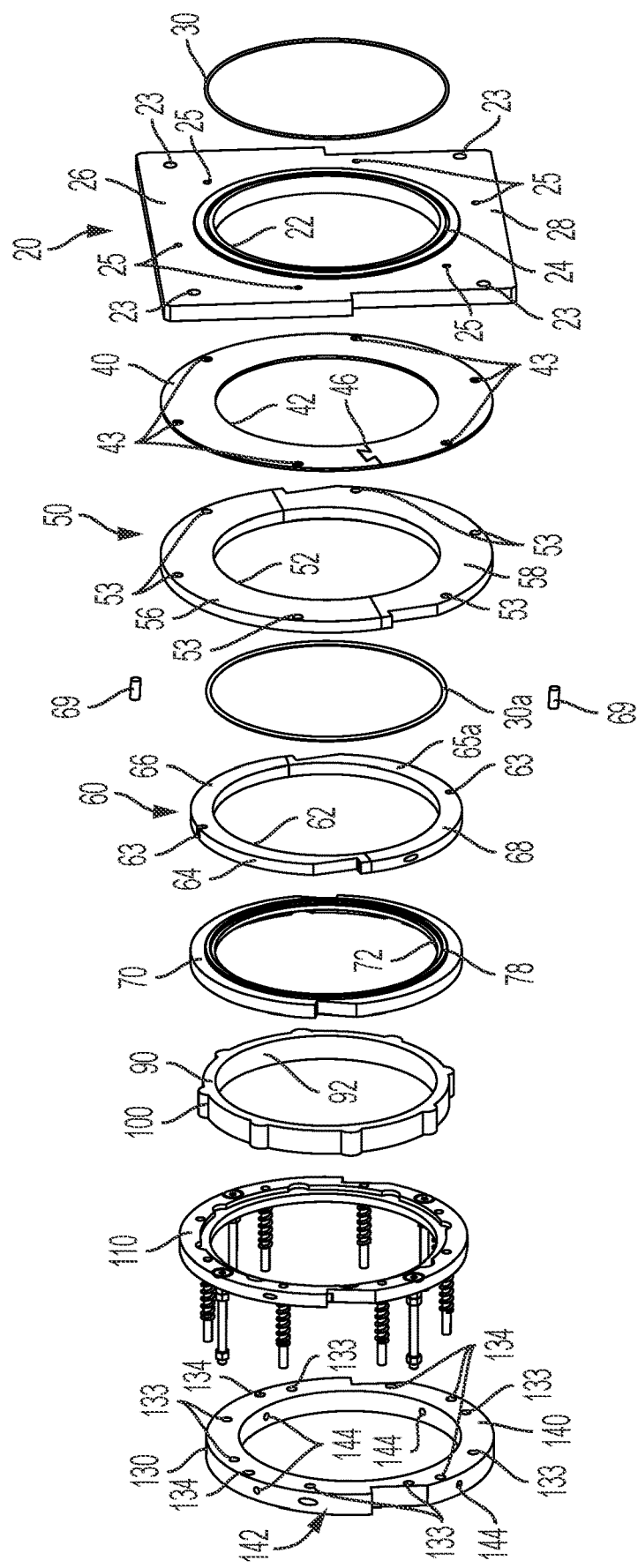
FIG. 16 is side perspective partially exploded view of the dynamic rotary shaft seal of FIG. 1 (with the rotatable shaft and some fasteners omitted).

As best shown in FIGS. 1 and 16, a gasket 40 may be disposed rearwardly with respect to the vessel-adapter plate 20. The gasket 40 may be formed of an elastomer or other suitable gasket material, as is known in the art. The gasket 40 may be non-rotatably fixed to the vessel-adapter plate 20 and in turn the vessel wall 300 and to the remaining non-rotating components by screws 32, which pass through mounting apertures 43 (FIG. 16) in the gasket 40 and engage one or both of the vessel-adapter plate 20 and the vessel wall 300. The gasket 40 has a central bore 42 and may be formed with an irregular slot or dovetail slot 46 (FIG. 16) that may be disengaged and reengaged to create an opening in the gasket 40 for convenient installation and removal. The central bore 42 is sized to accommodate the rotatable shaft 150 and preferably may be sized to fit closely about the rotatable shaft 150, while providing some clearance to accommodate runout.

Figure 3:
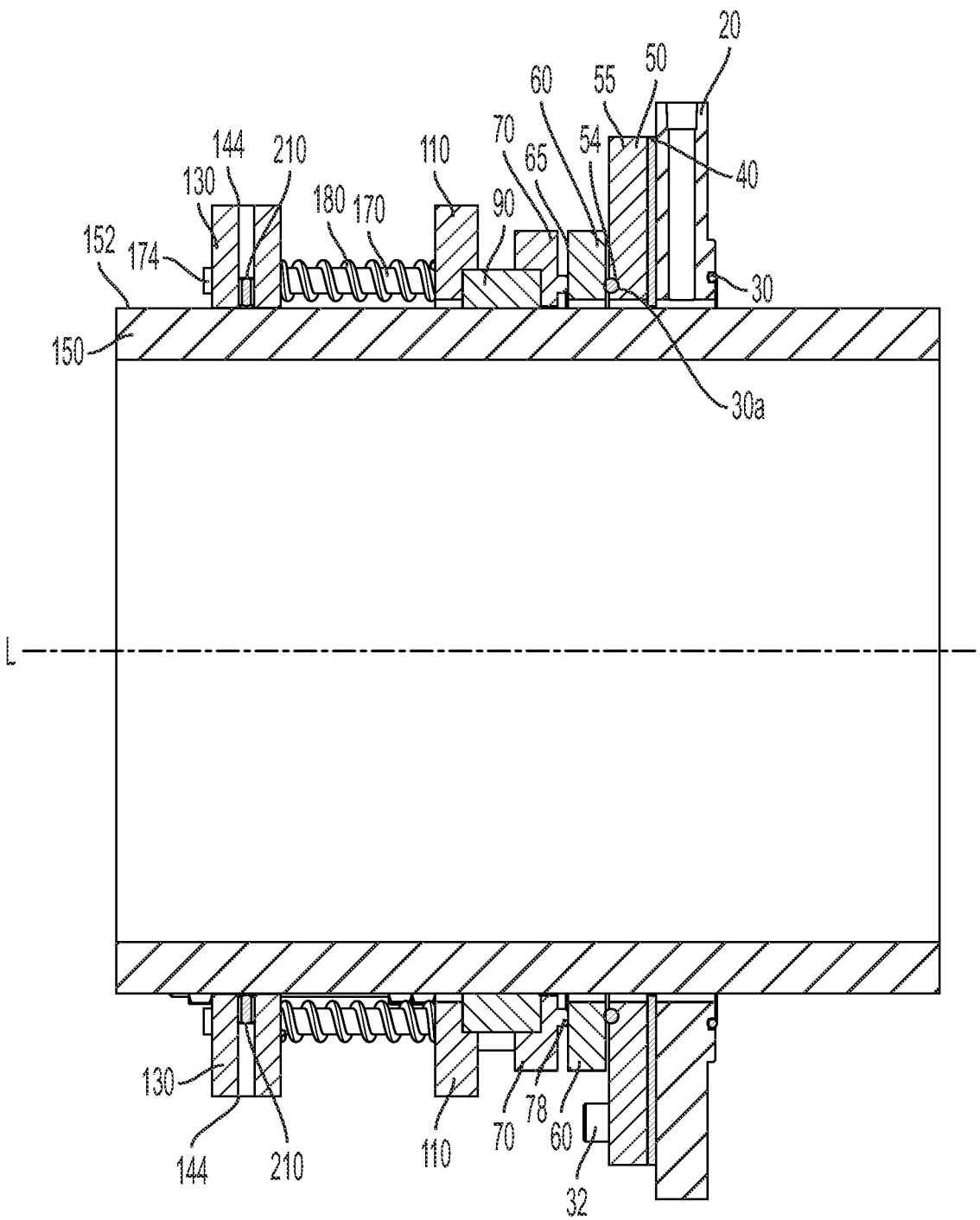
FIG. 3 is a side sectional partial view of the dynamic rotary shaft seal and shaft of FIG. 1 taken along line 3-3 of FIG. 1.
Figure 14:
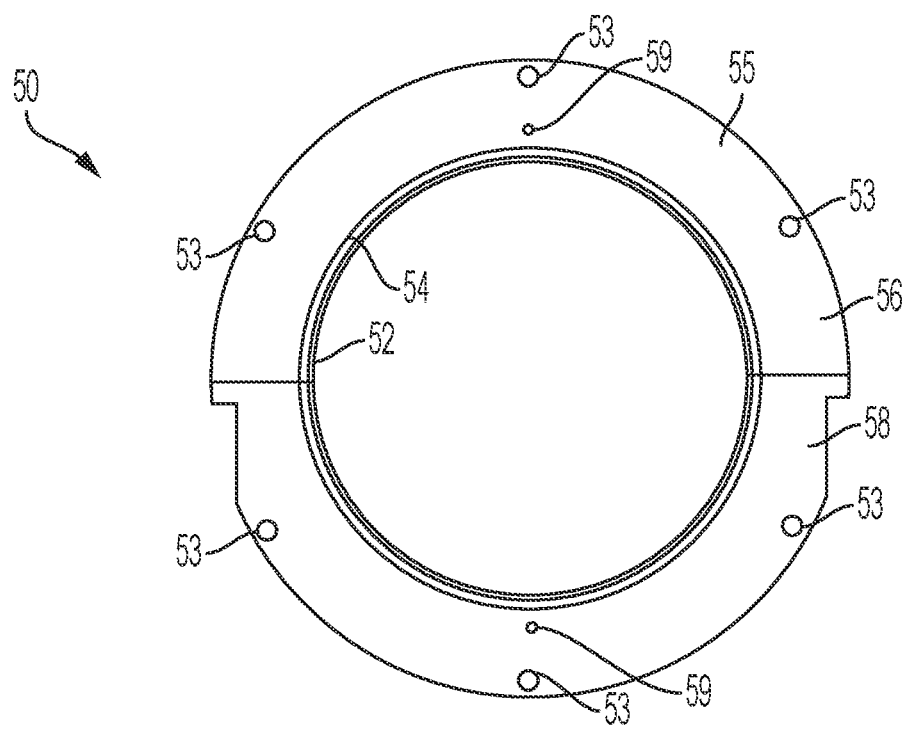
FIG. 14 is a rear side elevational view of a adapter plate of the dynamic rotary shaft seal of FIG. 1.
Figure 15:
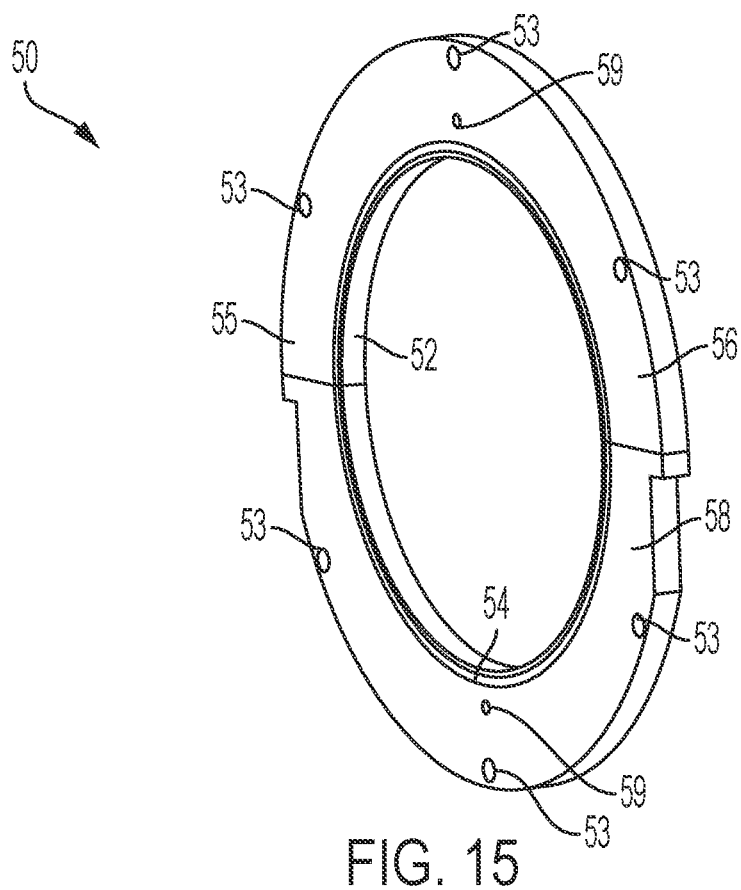
FIG. 15 is a rear side perspective view of the adapter plate of FIG. 14.

Referring to FIGS. 1-6 and 14-16, an adapter plate 50 is disposed rearwardly with respect to the gasket 40. The adapter plate 50 has a central bore 52 and is alignable with and non-rotatably fixed to the vessel wall 300 and to the remaining non-rotating components (either directly or by being fixed to another non-rotating component, here the vessel-adapter plate 20) by a plurality of screws 32, which pass through mounting apertures 53 in the adapter plate 50 and engage the vessel-adapter plate 20 via secondary mounting apertures 25 and may engage the vessel wall 300 directly. The adapter plate 50 may preferably be formed from a first partial plate 56 and a second partial plate 58 to allow the adapter plate 50 to be removed and replaced or reinstalled with the rotatable shaft 150 remaining in place passing through the vessel wall 300. The first partial plate 56 may be secured to the second partial plate 58 by threaded connectors such as screws 32a (FIG. 1). The central bore 52 is sized to accommodate the rotatable shaft 150 and preferably may be sized to fit closely about the rotatable shaft 150, while providing some clearance to accommodate runout. An appropriate range of clearance may in some embodiments range from about 0.25 inch (6.4 mm) to 0.38 inch (9.5 mm). As shown in FIGS. 3, 14, and 15, a seat 54 may extend inwardly from a rearward face 55 of the adapter plate 50. An adapter-stator sealing member, which in the illustrated embodiment takes the form of a second O-ring 30a, is non-rotatably attached with respect to the adapter plate 50 and in the illustrated embodiment may be mounted in the seat 54. Thus the second O-ring 30a may protrude rearwardly from the seat 54 to contact a forward face 65a (FIGS. 6 and 16) of a stator plate 60 (discussed below). The rearward face 55 of the adapter plate 50 may include stator-pin holes 59, which may be blind holes and which are further described in the next paragraph below. The adapter plate 50 may be formed of a sturdy material sufficiently strong and having other properties, such as corrosion resistance, required for the application, as known in the art. Stainless steel is a suitable material for this component.

Figure 6:
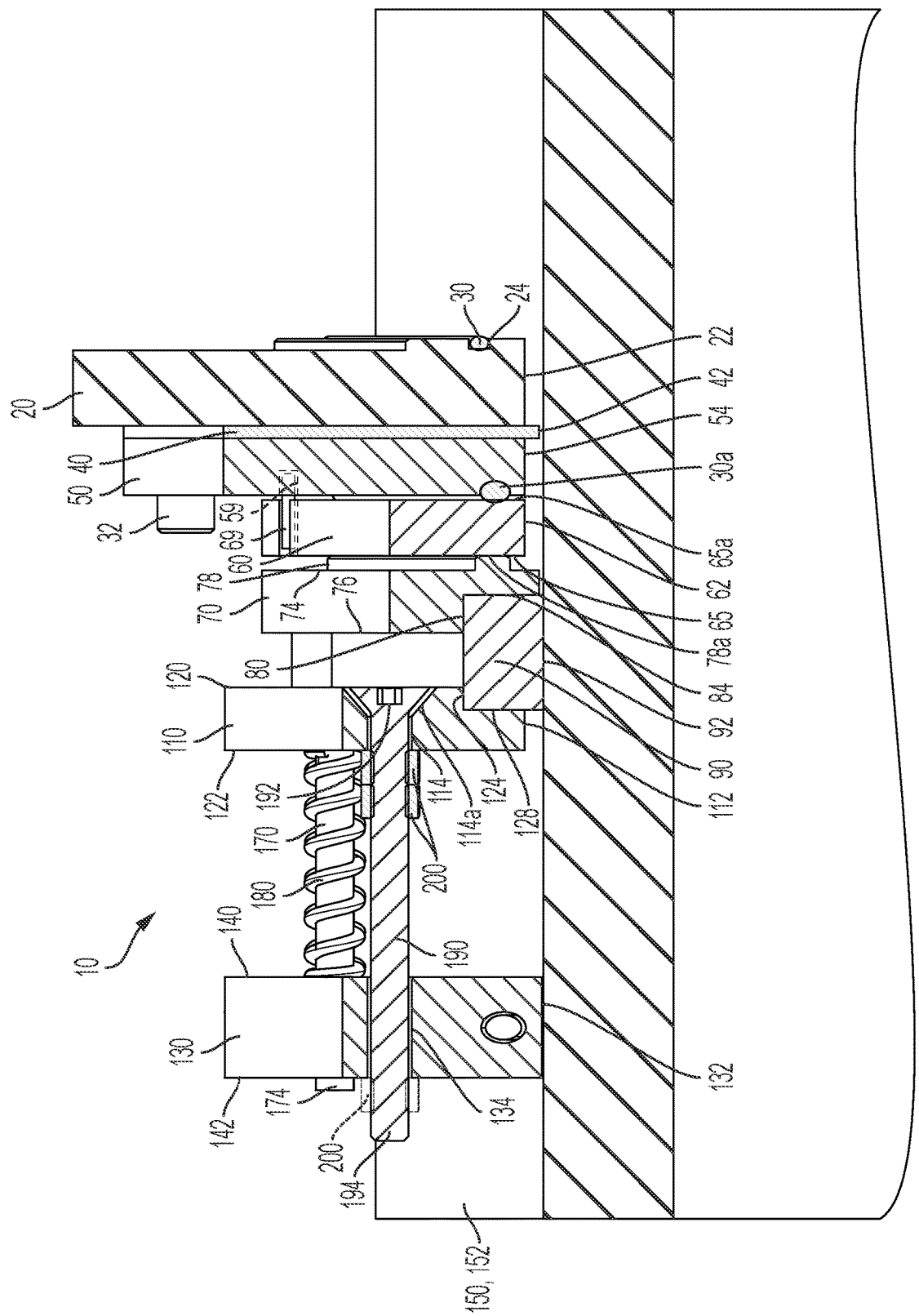
FIG. 6 is an enlarged partial sectional view showing an upper portion of the view of FIG. 5, with the dynamic rotary shaft seal in a second configuration in which the nuts 200 have been removed, with the removed nut 200 shown in phantom.
Figure 7:
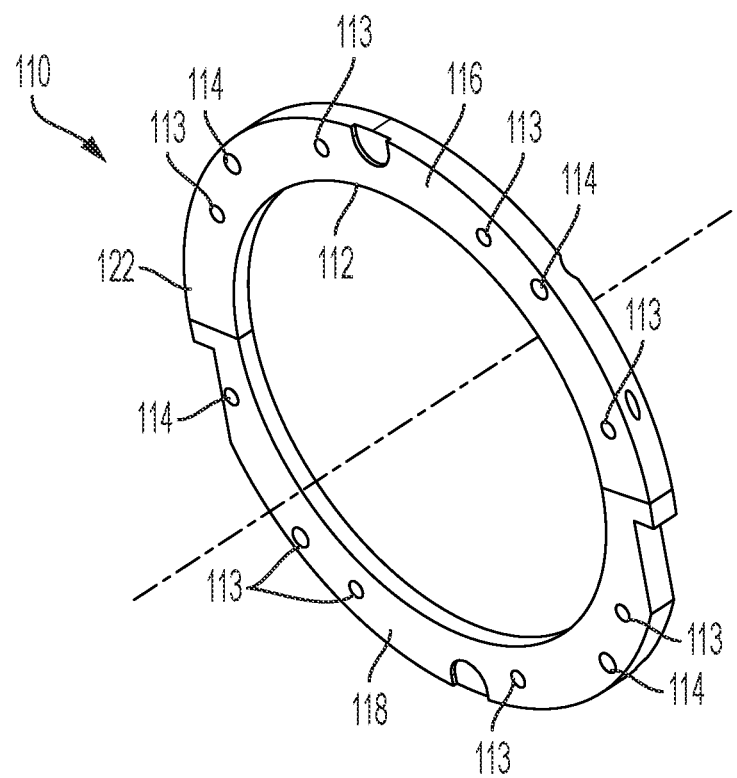
FIG. 7 is a back side perspective view of a drive ring of the dynamic rotary shaft seal of FIG. 1.

Referring to FIGS. 1-6 and 16, a stator plate 60 is disposed rearwardly with respect to the gasket 40 and is in contact with the second O-ring 30a protruding from the seat 54 of the adapter plate 50. The stator plate 60 may preferably be formed from a first partial plate 66 and a second partial plate 68, which may be secured to one another by screws 32a, to allow the stator plate 60, to be removed and replaced or reinstalled with the rotatable shaft 150 remaining in place passing through the vessel wall 300. The stator plate 60 may be non-rotatably attached with respect to the adapter plate by being so attached to the adapter plate 50, or may be non-rotatably attached to at least one of the other non-rotating components. In the illustrated embodiment, the stator plate 60 is non-rotatably fixed to the adapter plate 50 by stator pins 69 passing slidably though apertures of the stator plate 60, which in the illustrated embodiment take the form of slots 63 located in an edge 64 (FIG. 16) of the stator plate 60. The stator pins 69 engage compatible apertures in the form of holes or slots in the adapter plate 50; in the illustrated embodiment, the stator pins 69 are press fit into stator-pin holes 59 (two are shown), which are located radially inwardly from two of the mounting apertures 53. Thus the stator plate 60 is non-rotatably fixed to the non-rotating portion of the dynamic rotary shaft seal 10. The stator plate 60 includes a central bore 62. The central bore 62 is sized to accommodate the rotatable shaft 150 and preferably is sized to fit closely about the rotatable shaft 150, while providing some clearance to accommodate runout. The stator plate 60 has a rearward face 65, which is generally flat and smooth, and the previously identified forward face 65a (FIGS. 6 and 16). The stator plate 60 is formed of a sturdy material sufficiently strong and having other properties, such as corrosion resistance, required for the application, as known in the art. Stainless steel is a suitable material for this component.

The second O-ring 30a, which is made from a resilient material, provides a deformable interface between the adapter plate 50 and the stator plate 60, allowing for some play to accommodate runout of the rotatable shaft 150. Moreover, the stator pins 69 passing slidably through the slots 63 allow some axial movement and/or shifting and/or angular misalignment of the stator plate 60, or some tilting of the stator plate 60, with respect to the adapter plate 50. The slidable connection between the stator pins 69 and the stator plate 60, along with the deformability of the second O-ring 30a, helps to absorb movement of the rotatable shaft 150 resulting from runout and/or angular misalignment.

Together, any of the following elements, where present, form the non-rotating portion of the dynamic rotary shaft seal 10: the stator plate 60, the adapter plate 50, the gasket 40, and the vessel-adapter plate 20. Positioned generally further rearwardly is the rotating portion of the dynamic rotary shaft seal 10.

Referring to FIGS. 1-6, 11-13, and 16, the dynamic rotary shaft seal 10 further includes an interfacing boot 70, which in the illustrated embodiment is generally annular with some recessed features and some protruding features. The illustrated interfacing boot 70 is shown alone in FIGS. 11-13. The interfacing boot 70 has a central bore 72 and may have a close fit with respect to the rotatable shaft 150. Sufficient clearance is provided between the interfacing boot 70, or any interfacing boot, and the rotatable shaft 150 to allow the interfacing boot 70 to slide axially along the rotatable shaft 150. An appropriate range of clearance may in some embodiments range from about 0.25 inch (6.4 mm) to 0.38 inch (9.5 mm). The interfacing boot 70 may preferably be formed from a first partial plate 71a and a second partial plate 71b (FIGS. 11-13), which may be secured to one another by screws 32b, to allow the interfacing boot 70 to be removed and replaced or reinstalled with the rotatable shaft 150 remaining in place passing through the vessel wall 300. The interfacing boot 70 is rotatably fixed to prevent relative rotation thereof with respect to the rotatable shaft 150 and, therefore, rotates with the rotatable shaft 150, thus rotating with respect to the non-rotating portion of the dynamic rotary shaft seal 10 described above. The interfacing boot 70 has a forward face 74, a rearward face 76, and a lip 78 protruding forwardly and extending circumferentially from the forward face 74. As seen in FIGS. 2-6, the lip 78 is in sliding contact with the stator plate 60 as the rotatable shaft 150 rotates with respect to the non-rotating portion of dynamic rotary shaft seal 10. The lip 78 may be located radially (vertically as shown in FIGS. 2-6) an any convenient location on the interfacing boot 70, including radially inwardly adjacent the central bore 70, radially outwardly, or in a relatively central position as shown in FIGS. 2-6. The lip 78 may be relatively short axially as shown, or may take on different proportions consistent with the functions thereof described herein. In the illustrated embodiment, the lip 78 has a forward surface 78a that is smaller radially (vertically in FIGS. 2-6) than the rearward face 65 of the stator plate 60, so that the lip 78 can move radially (up or down in FIG. 6, for example) due to runout of the rotatable shaft 150 without losing contact with the stator plate 60. The interfacing boot 70 and/or the lip 78 and/or the forward surface 78a may be made from or coated with polytetrafluoroethylene (PTFE) to reduce friction between the lip 78 and the rearward face 65 of the stator plate 60. Facing the rearward face 76, the interfacing boot 70 may have engagement features allowing the interfacing boot 70 to be rotationally locked to rotate with a mating component (described below). The rearward face 76 may include a ledge 80 extending axially and a plurality of engagement features in the form of indents 82 extending radially (radially inwardly in the illustrated embodiment) with respect to the ledge 80. The seal 10 may include a first radial wall configured to prevent the central boot from passing forwardly with respect to the first radial wall. In the illustrated embodiment, the first radial wall appears in the form of a radial wall 84 of the interfacing boot 70. Where present, the ledge 80 and the indents 82 may be bordered by the radial wall 84 located forward of the ledge 80 and the indents 82.

Referring to FIGS. 1-6, 9, 10, and 16, the dynamic rotary shaft seal 10 further includes a central boot 90 sealingly and non-rotatably attachable with respect to the rotatable shaft 150. In the illustrated embodiment, the central boot 90 is generally annular with protruding features. An example of the central boot 90 is shown alone in FIGS. 9 and 10. The central boot 90 has a central bore 92 with a radial interference fit with respect to the rotatable shaft 150, resulting in a sealing engagement with the rotatable shaft 150. The central boot 90 is rotatably fixed to the rotatable shaft 150 to prevent relative rotation with respect thereto and, therefore, rotates with the rotatable shaft 150, thus rotating with respect to the non-rotating portion of the dynamic rotary shaft seal 10 described above. The central boot 90 has a forward face 94, a rearward face 96, and an outer axial surface 98. The central boot 90 may include a plurality of engagement features in the form of lugs 100 extending radially (radially outwardly in the illustrated embodiment). Each lug 100 is located, sized, and complementarily shaped to engage with and lock into a corresponding indent 82 (engagement feature) of the interfacing boot 70. The lugs 100 are adapted to engage the central boot 90 and the interfacing boot 70 to prevent relative circumferential movement (and thus relative rotation) thereof, while allowing a degree of relative axial movement (because the lugs 100 can slide axially in the indents 82), which aids in assembly. In the illustrated embodiment, the interfacing boot 70 includes a radial wall 84 preventing the central boot 90 from passing forwardly entirely through the interfacing boot 70. The central boot 90 is preferably made of an elastomeric material, but may be made of any suitable material known in the art—for example, silicone, compounds of fluoropolymer elastomer and synthetic rubber compound such as those sold under the trademark Viton (available from DuPont), nitrile rubber (also known as acrylonitrile butadiene rubber, NBR, or Buna-N), EPDM (ethylene propylene diene monomer) or other rubber materials, and the like.

Figure 8:
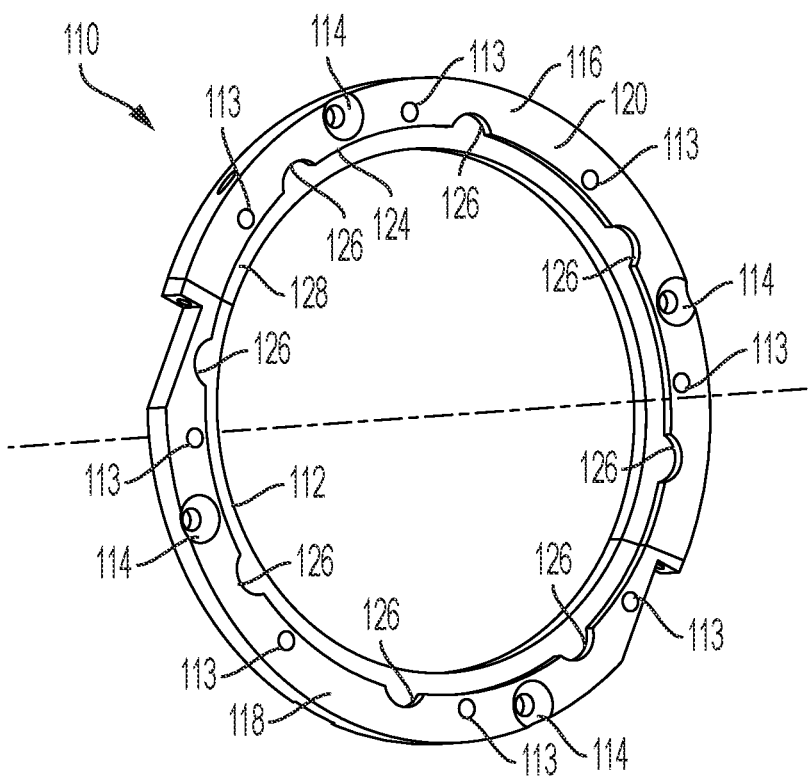
FIG. 8 is a front side perspective view of the drive ring of FIG. 7.
Figure 9:
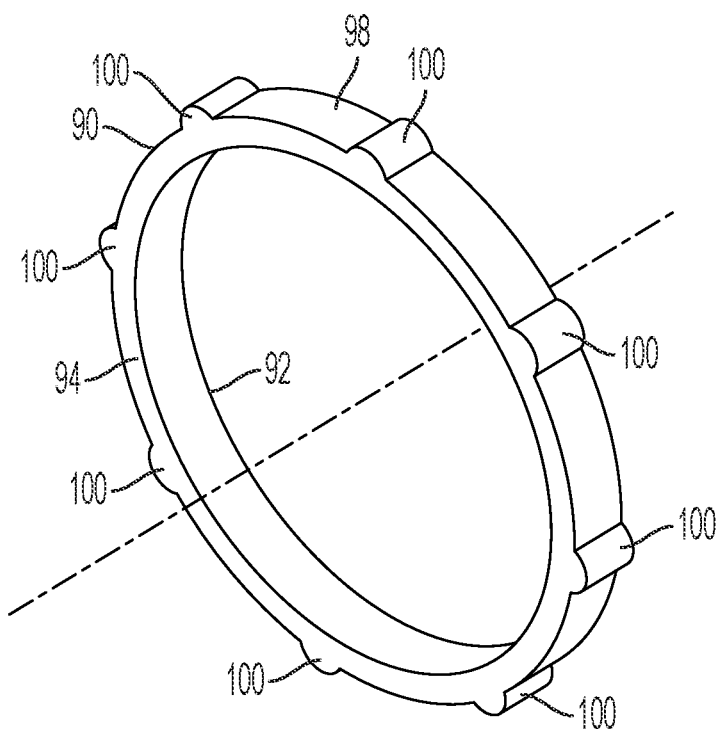
FIG. 9 is a back side perspective view of a central boot of the dynamic rotary shaft seal of FIG. 1.
Figure 10:
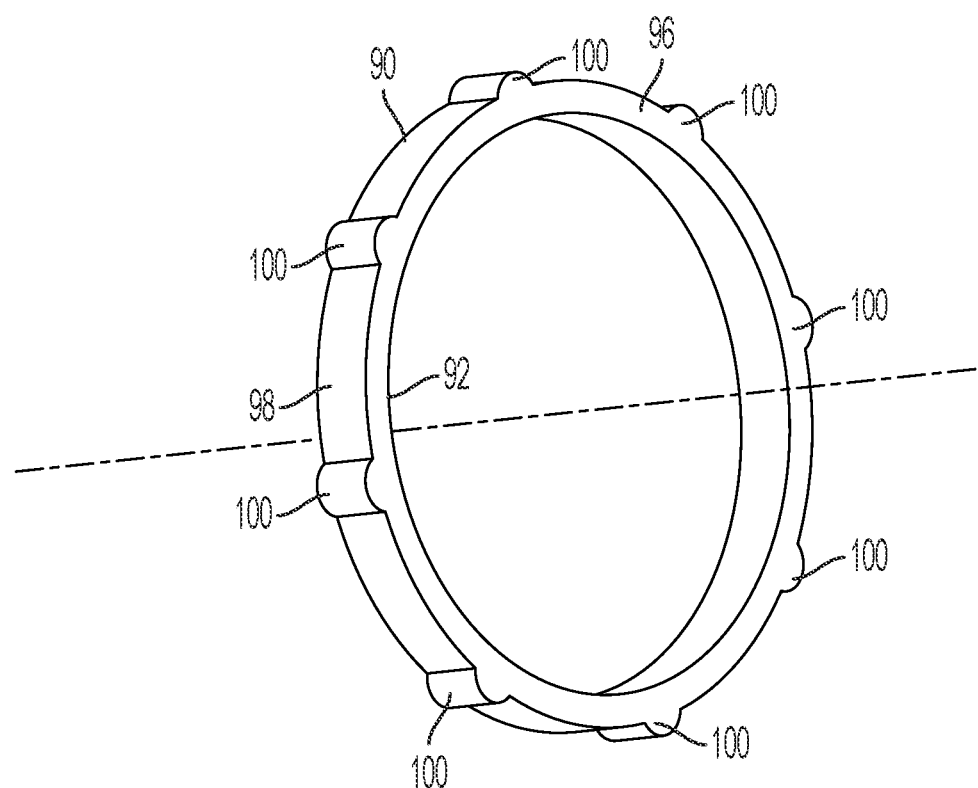
FIG. 10 is a front side perspective view of the central boot of FIG. 9.
Figure 11:
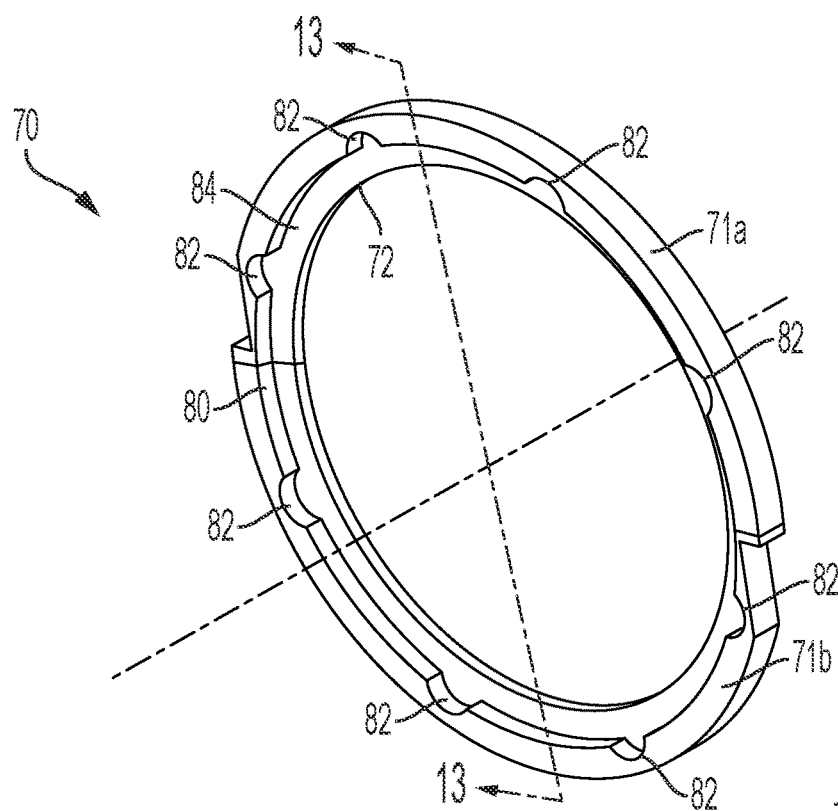
FIG. 11 is a back side perspective view of an interfacing boot of the dynamic rotary shaft seal of FIG. 1.
Figure 12:
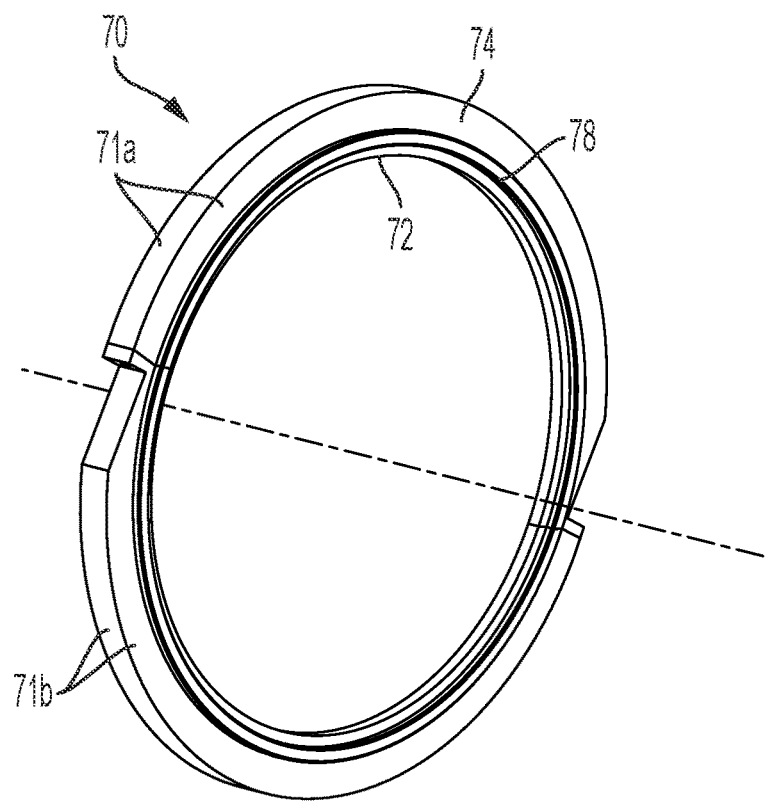
FIG. 12 is a front side perspective view of the interfacing boot of FIG. 11.
Figure 13:
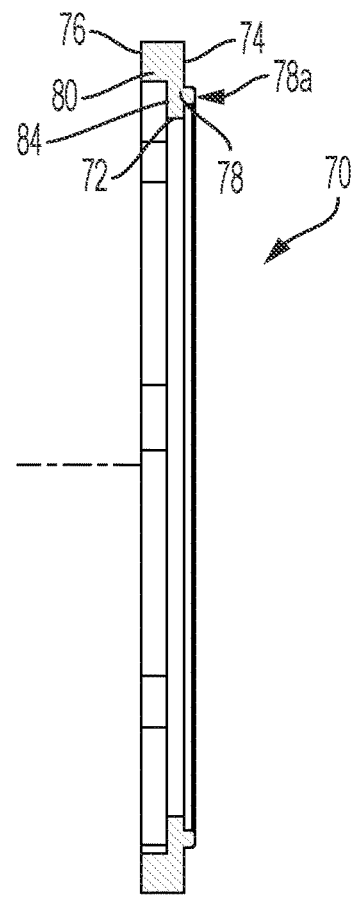
FIG. 13 is a cross sectional view of the interfacing boot of FIG. 11 taken along line 13-13 of FIG. 11.

Referring to FIGS. 1-6, 7, 8, and 16, the dynamic rotary shaft seal 10 further includes a drive ring 110, which is generally annular with protruding features and with apertures passing therethrough. The drive ring 110 is shown alone in FIGS. 7 and 8. The drive ring 110 has a central bore 112 and preferably is sized to fit closely about the rotatable shaft 150, while providing some clearance to accommodate axial movement (axial sliding) of the drive ring 110 along the rotatable shaft 150. The drive ring 110 also has two sets of axial holes (pin holes 113 and bolt holes 114) for connecting the drive ring 110 to other components, as described below. The drive ring 110 may preferably be formed from a first partial plate 116 and a second partial plate 118 to allow the drive ring 110 to be removed and replaced or reinstalled with the rotatable shaft 150 remaining in place passing through the vessel wall 300. The drive ring 110 is formed of a sturdy material sufficiently strong and having other properties, such as corrosion resistance, required for the application, as known in the art. Stainless steel is a suitable material for this component. The drive ring 110 is fixed indirectly to the rotatable shaft 150 (as described below) and rotates with the rotatable shaft 150, thus rotating with respect to the non-rotating portion of the dynamic rotary shaft seal 10 described above. The drive ring 110 has a forward face 120 and a rearward face 122. The bolt holes 114 described above preferably are countersunk on the forward face 120 (FIG. 8). In the illustrated embodiment, adjacent and axially inset from the forward face 120, the drive ring 110 has engagement features allowing the drive ring 110 to be rotationally locked in order to rotate with a mating component in the form of the central boot 90. The forward face 120 includes a ledge 124 extending axially and a plurality of engagement features in the form of indents 126 extending radially (radially inwardly in the illustrated embodiment) with respect to the ledge 124. The seal 10 may include a second radial wall configured to prevent the central boot 90 from passing rearwardly with respect to the second radial wall, with the result that the second radial wall may urge the central boot 90 forwardly. In the illustrated embodiment, the second radial wall appears in the form of a radial wall 128 of the drive ring 110. The ledge 124 and the indents 126 are bordered by the radial wall 128 located rearward of the ledge 124 and the indents 126. The radial wall 128 bears against the central boot 90, and when the drive ring 110 is urged axially forwardly (as described below), the radial wall urges the central boot 90 forwardly. Each indent 126 is located, sized, and complimentary shaped to engage with and lock into a corresponding lug 100 (engagement feature) of the central boot 90. The indents 126 and the lugs 100 are adapted to engage the drive ring 110 and the central boot 90 together to prevent relative circumferential movement (and thus relative rotation) thereof, while allowing a degree of relative axial movement (because the lugs 100 can slide axially in the indents 126). Because the interfacing boot 70 is similarly locked to the central boot 90 in the assembled device, the interfacing boot 70, the central boot 90, and the drive ring 110 are all locked together in the assembled device, preventing circumferential movement and relative rotation therebetween and causing the interfacing boot 70, the central boot 90, and the drive ring 110 to rotate together.

Note that the engagement features disclosed herein—the lugs 100 of the central boot 90, the indents 126 of the drive ring 110, and the indents 82 of the interfacing boot 70—are examples of suitable embodiments. As used herein, "engagement features" may include any features able to rotationally lock the central boot 90 to the drive ring 110 and to the interfacing boot 70. For example, in alternative embodiments (not shown), engagement features such as lugs and indents, 126 could differ in size, curvature, or shape from the lugs 100 and indents 82, 126 shown herein. For another example, in an alternative arrangement, the central boot 90 could have engagement features in the form of indents, and the drive ring 110 and the interfacing boot 70 could have lugs. Alternatively, the interfacing boot 70 could have engagement features in the form of pins, a tri-clover clamp, or other mechanisms locking the drive ring 110 and interfacing boot 70 to prevent relative rotation thereof.

Referring to FIGS. 1-6, 7, 8, and 16, the dynamic rotary shaft seal 10 further includes an anchor ring 130, which may be generally annular with various axial and radial apertures. The anchor ring 130 has a central bore 132 and preferably may be sized to fit closely about the rotatable shaft 150, while providing some clearance to accommodate axial movement along the rotatable shaft 150 during installation. The anchor ring 130 does not move axially when in use; the anchor ring 130 is fixed to the rotatable shaft 150 during rotation of the rotatable shaft 150. The anchor ring 130 has a forward face 140 and a rearward face 142. The anchor ring 130 may have two sets of axial holes (pin holes 133 and bolt holes 134) for connecting the anchor ring 130 to the drive ring 110. The anchor ring 130 may preferably be formed from a first partial plate 136 and a second partial plate 138 to allow the anchor ring 130 to be removed and replaced or reinstalled with the rotatable shaft 150 remaining in place passing through the vessel wall 300. The anchor ring 130 is formed of a sturdy material sufficiently strong and having other properties, such as corrosion resistance, required for the application, as known in the art. Stainless steel is a suitable material for this component.

The anchor ring 130 also may have corresponding apertures 144 (FIGS. 1, 3, 16) oriented radially, with each aperture 144 being threaded and sized to accommodate a set screw 210 (FIG. 3). Each set screw 210 may be, for example, a high-hold set screw with a cone point and a socket or other suitable drive fitting disposed opposite the cone point. Together the plurality of set screws 210 engage both the apertures 144 and the rotatable shaft 150 and thereby secure the anchor ring 130 to the rotatable shaft 150, axially and radially locking the anchor ring 130 to the rotatable shaft 150 and preventing both axial and radial movement of the anchor ring 130 with respect to the rotatable shaft 150. In the illustrated embodiment, the anchor ring 130 has six radial apertures 144, which accommodate six set screws 210. The number of apertures 144 and set screws 210 may be adapted to the needs (including holding strength and ease of assembly) of a particular application.

Figure 4:
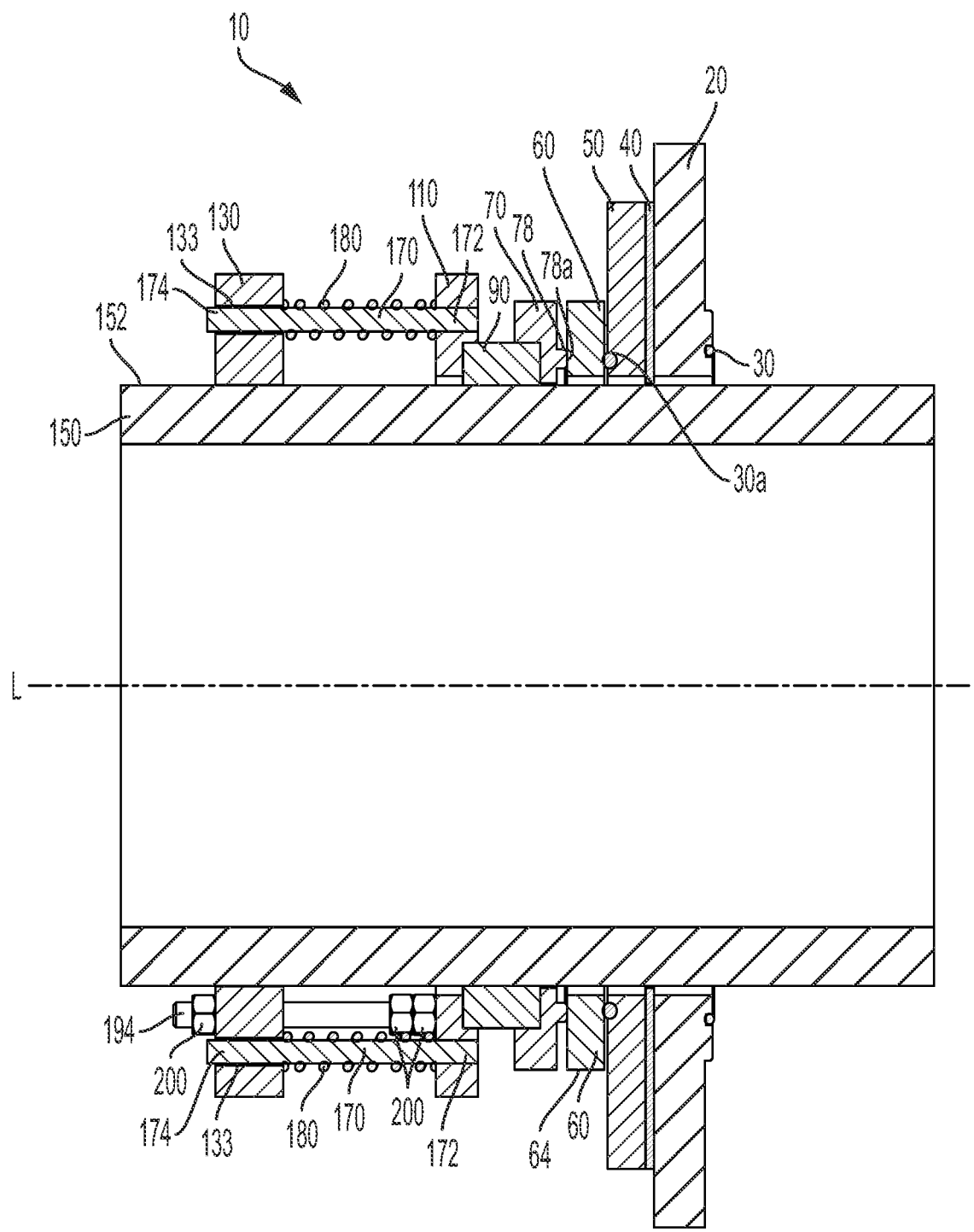
FIG. 4 is a side sectional partial view of the dynamic rotary shaft seal and shaft of FIG. 1 taken along line 4-4 of FIG. 1.
Figure 5:
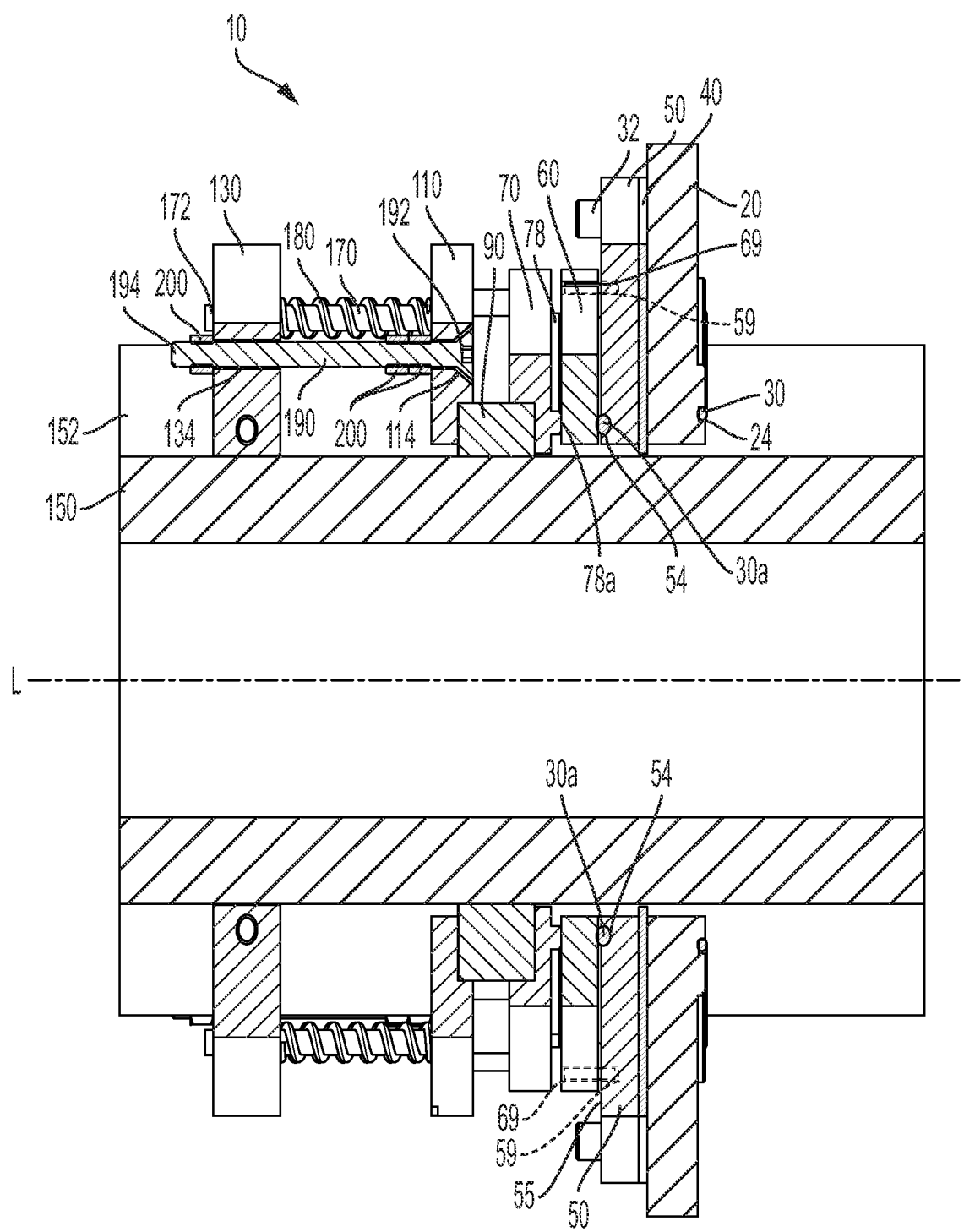
FIG. 5 is a side sectional partial view of the dynamic rotary shaft seal and shaft of FIG. 1 taken along line 5-5 of FIG. 1.

The anchor ring 130 and the drive ring 110 may be initially assembled with respect to one another in a first configuration as follows. The anchor ring 130 and the drive ring 110 are initially connected to one another by a plurality of pins 170 and a plurality of bolts 190. Each pin 170 has a first end in the form of a forward end 172 engaging one of the pin holes 113 of the drive ring 110 and fixed within the corresponding pin hole 113, for example, by being sized for an interference fit in the pin hole 113 or being otherwise secured within the pin hole 113. Alternatively, the forward ends 172 of the pins 170 may be attached to the drive ring 110 by threaded fasteners, welds, or other suitable means of attachment. As best seen in FIG. 4, each pin 170 also has second end in the form of a rearward end 174, with each rearward end 174 preferably slidably engaging the corresponding pin hole 133 so that the pin 170 is axially slidable within the corresponding pin hole 133 with minimal radial movement within the pin hole 133, and so that the drive ring 110 is axially slidable and axially slides along the pin 170 and the rotatable shaft 150 with respect to the anchor ring 130. Each pin 170 is of sufficient length that advancement of the drive ring 110 will not cause the pin 170 to be removed from the pin hole 133 of the anchor ring 130. The pin holes 113 are aligned with corresponding pin holes 133 to that each pin 170 is axially aligned in parallel with respect to the rotatable shaft 150. The pins 170 engaged in the respective pin holes 113, 133 transmit the rotational movement of the anchor ring 130 (which is fixed to the rotatable shaft 150 in use) to the drive ring 110 and thus to the remaining rotating components of the dynamic rotary shaft seal 10.

With respect to the first configuration of the anchor ring 130 and the drive ring 110, a bias member is provided to urge the anchor ring 130 and the drive ring 110 axially apart with respect to one another. The illustrated embodiment includes a plurality of bias members in the form of a plurality of coil springs 180, with each coil spring 180 surrounding each pin 170. Each coil spring 180 has first and in the form of a forward end engaging the drive ring 110 and second end in the form of a rearward end engaging the anchor ring 130. Suitable bias members include other devices capable of supplying a reactive force in response to the anchor ring 130 and the drive ring 110 being urged toward one another—for example, other types of springs such as air springs, or like poles of magnets.

Further with respect to the first configuration of the anchor ring 130 and the drive ring 110, at least one compression member is provided to compress the bias members that urge the anchor ring 130 and the drive ring 110 axially apart. The illustrated embodiment includes a plurality of compression members in the form of a plurality of bolts 190, with each bolt having, for example, a flat-head socket fitting. Each bolt 190 has a first end in the form of a forward end 192 (with a socket fitting and a flat head) and a second end in the form of a rearward end 194. The forward end 192 of each bolt 190 engages the drive ring 110 via one of the bolt holes 114 (including the countersunk portion 114a thereof) discussed above. Each bolt 190 is threadedly engaged by one more nuts 200 (two in the illustrated embodiment) to secure the bolt 190 to the drive ring 110. The rearward end of each bolt 190 passes through a corresponding bolt hole 134 of the anchor ring 130, with a nut 200 threadedly engaging the rearward end 194 of the bolt 190 and the rearward face 142 of the anchor ring 130. Thus the nuts 200 at the rearward end 194 of the bolt 190, in combination with the bolt 190, are arranged and configured so that by tightening the nuts 200 at the rearward end 194, the anchor ring 130 and the drive ring 110 are urged toward one another. The bias members/springs 180 are compressed between the anchor ring 130 and the drive ring 110, and thus the bias members/springs 180 provide a reaction force urging the anchor ring 130 and the drive ring 110 axially away from each other.

The seal 10 of the illustrated embodiment may be assembled to the vessel wall 300 and the rotatable shaft 150 as follows. The non-rotating components may be secured to the vessel wall 300. The first partial plate 26 and the second partial plate 28 may be secured to one another by screws 32 (as shown in FIG. 1) to form the vessel-adapter plate 20, which surrounds the rotatable shaft 150. A vessel-adapter sealing member, which may take the form of a first O-ring 30, may be disposed between the vessel wall 300 and the vessel-adapter plate 20. For the seal 10 of the illustrated embodiment, the vessel-adapter plate 20 may be non-rotatably and axially fixed to the vessel wall 300 by a plurality of screws 32 passing through mounting apertures 23 (FIG. 16) in the vessel-adapter plate 20 and engaging the vessel wall 300. In assembling the seal 10 according to the illustrated embodiment, a gasket 40 may be non-rotatably fixed to the vessel wall 300 and to the remaining non-rotating components by screws 32, which pass through mounting apertures 43 (FIG. 16) in the gasket 40 and engage one or both of the vessel-adapter plate 20 (via the mounting apertures 23) and the vessel wall 300.

In assembly of the dynamic rotary shaft seal 10, the adapter plate 50 may be assembled from the first partial plate 56 and the second partial plate 58, which may be secured to one another and surrounding the rotatable shaft 150 by screws 32a (as shown in FIG. 1). An adapter-stator sealing member, which may take the form of a second O-ring 30a, may be mounted in the seat 54, with the second O-ring 30a protruding from the seat 54 to contact and bear against the rearward face 55 of the stator plate 50. The adapter plate 50 may be non-rotatably fixed to the vessel wall 300 and to the remaining non-rotating components (either directly or by being fixed to another non-rotating component, here the vessel-adapter plate 20) by a plurality of screws 32. In the illustrated embodiment, the screws 32 pass through mounting apertures 53 in the adapter plate 50 and engage the vessel-adapter plate 20 via secondary mounting apertures 25 of the vessel-adapter plate 20. The screws 32 may (but typically will not) engage the vessel wall 300 directly.

Continuing with assembly of the dynamic rotary shaft seal 10, the stator plate 60 may preferably be assembled from a first partial plate 66 and a second partial plate 68 secured to one another and surrounding the rotatable shaft 150 by screws 32a. The stator plate 60 may be non-rotatably fixed to the adapter plate 50, or to at least one of the other non-rotating components, by stator pins 69 passing slidably though apertures of the stator plate 60, which in the illustrated embodiment take the form of slots 63 located in an edge 64 of the stator plate 60, and press fit into stator-pin holes 59 in the adapter plate 50.

The stator plate 60, and in particular the forward face 65a thereof, may contact the O-ring 30a protruding from the seat 54 of the adapter plate 50 so that the stator plate 60 tilts in response to, or tilts to accommodate, runout or axial misalignment of the rotatable shaft 150. Securing the stator plate 60 may complete installation of the non-rotatable portion of the dynamic rotary shaft seal 10.

Continuing with assembly of the dynamic rotary shaft seal 10, the rotatable portion may be assembled as follows. The interfacing boot 70 may preferably be assembled from a first partial plate 71a and a second partial plate 71b (FIGS. 11-13) surrounding the rotatable shaft 150 by screws 32b. The lip 78 of the interfacing boot may be assembled in sliding contact with the rearward face 65 of the stator plate 60. The interfacing boot, for example the interfacing boot 70, may be non-rotatably fixed with respect to the rotatable shaft 150 by being attached to drive ring or to another component rotatable with the rotatably shaft 150. With respect to the illustrated embodiment, the central boot 90 may be placed on the rotatable shaft 150 and slid (despite the interference fit with the rotatable shaft 150) to a selected location, preferably until the engagement features (lugs 100) of the central boot 90 have engaged the compatible engagement features (indents 82) of the interfacing boot 70.

Continuing with assembly of the dynamic rotary shaft seal 10, the anchor ring 130 and the drive ring 170 may assembled and pre-loaded in compression, preferably by being assembled and pre-loaded on the rotatable shaft 150. The drive ring 110 may be assembled on the rotatable shaft 150 from a first partial plate 116 and a second partial plate 118 connected by screws 32. The anchor ring 130 may as assembled rearwardly of the drive ring 100 from a first partial plate 136 and a second partial plate 138 secured by screws 32.

The anchor ring 130 and the drive ring 110 may be initially connected to one another in a first configuration by a plurality of pins 170 and a plurality of bolts 190. Each forward end 172 of each respective pin 170 is engaged with one of the pin holes 113 of the drive ring 110 and fixed within the corresponding pin hole 113, for example, by being sized for an interference fit in the pin hole 113 or being otherwise secured within the pin hole 113. Alternatively, the forward ends of the pins 172 may be attached to the drive ring 110 by threaded fasteners, welds, or other suitable means of attachment. Each rearward end 174 of each respective pin 170 is slidably engaged in the corresponding pin hole 133 of the anchor ring 130 so that the pin 170 is axially slidable within the corresponding pin hole 133 with minimal radial movement within the pin hole 133; so that the drive ring 110 may be axially slidable, each pin 170 slides within the corresponding pin hole 133 of the anchor ring 130.

As noted above, the pin holes 113 are aligned with corresponding pin holes 133 so that each pin 170 is axially aligned in parallel with the rotatable shaft 150. Compression members in the form of the bolts 190 in combination with nuts 200 may then be secured to the anchor ring 130 and the drive ring 110 by nuts 200. As noted above, the forward end 192 of each bolt 190 engages the drive ring 110 via one of the bolt holes 114 (including the countersunk portion 114a thereof). Each bolt 190 is threadedly engaged by one more nuts 200 adjacent the drive ring 110 (two in the illustrated embodiment) to secure the bolt 190 to the drive ring 110. The rearward end 194 of each bolt 190 passes through a corresponding bolt hole 134 of the anchor ring 130, with a nut 200 threadedly engaging the rearward end 194 of the bolt 190 and the rearward face 142 of the anchor ring 130. Thus the nuts 200 at the rearward end 194 of the bolt 190, in combination with the bolt 190, are arranged and configured so that by tightening the nuts 200 at the rearward end 194 the anchor ring 130 and the drive ring 110 are urged toward one another. By tightening the nuts 200 to compress the springs 180 between the anchor ring 130 and the drive ring 100, a selected reaction force provided by the springs may be either calculated (based on the spring characteristics and the degree of compression) or measured (by a load cell or otherwise as is known in the art). Other compression members such as external clamps engaging the anchor ring 130 and the drive ring 110, other types of springs, or repelling poles of magnets may be used.

Once the nuts have been tightened on the bolts 190 (or other compression members have been engaged to accomplish the same) to provide an appropriate reaction force from the springs 180, the anchor ring 130 and the drive ring 100 may be slid axially forwardly along the rotatable shaft 150 until the engagement features (indents 126) of the drive ring 100 are engaged with the engagement features (lugs 100) of the central boot 90 and the central boot 90 has advanced as desired, preferably until central boot makes contact with the radial wall 84 of the interfacing boot 70. The set screws 210 are then tightened, engaging the surface 152 of the rotatable shaft 150 and locking the anchor ring 130 axially and radially to the rotatable shaft 150. The nuts 200 located rearwardly of the anchor ring 130 are then loosened or removed (see FIG. 6, with the removed nut 200 shown in phantom). Removing or loosening the nuts 200 places the anchor ring 130 and the drive ring 110 in a second configuration, releasing the drive ring 110 to move forwardly axially as a result of the reaction force from the springs 180 (or other bias members, where present). The drive ring 110 urges the interfacing boot 70 forwardly so that the lip 78 bears against the rearward face 65 of the stator plate 60. In the illustrated embodiment, the drive ring 110 does so indirectly by bearing axially forwardly on the central boot 90, urging the central boot 90 forwardly (despite the interference fit of the central boot 90 with the rotatable shaft 150), with the central boot 90 urging the interfacing boot 70 forwardly.

The drive ring 110 thus is fixed indirectly to the rotatable shaft 150 and rotates with the rotatable shaft 150 as a result of being rotationally fixed to the anchor ring 130 by the pins 170. The drive ring 110 bears forwardly, driving the lip 78 of the interfacing boot 70 to bear against the rearward face 65 of the stator plate 60. In the illustrated embodiment, the drive ring 110 causes the indents 126 of the drive ring 110 and the lugs 100 of the central boot 90 to maintain engagement, causing the lugs 100 of the central boot and the indents 82 of the interfacing boot to maintain engagement, while driving the lip 78 of the interfacing boot 70 to bear against the rearward face 65 of the stator plate 60. Referring to FIG. 3, the central boot 90 seals against leakage tending to flow axially along the surface 152 of the rotatable shaft 150. The interfacing boot 70 seals against leakage tending to flow radially at the interface between the lip 78 and the rearward face 65 of the stator plate 60. The lip 78 is made from or coated with polytetrafluoroethylene (PTFE) and undergoes more rapid wear than the rearward face 65 of the stator, which is metal or another durable material. As the lip 78 wears and decreases in size (such as by having the axial length of the lip 78 worn down), the drive ring 110 urges the central boot 90, and indirectly urges the lip 78, forwardly to maintain a selected degree of force and pressure of the lip 78 in bearing against the rearward face 65. Thus the dynamic rotary shaft seal 10 is self-adjusting, reducing the need for maintenance to maintain sealing performance. And because the lip 78 is smaller radially than the rearward face 65, the lip 78 can move radially with the rotatable shaft 150 when runout occurs, without a loss of sealing at the interface between the lip 78 and the rearward face 65.

The present invention includes not only the dynamic rotary shaft seal 10 as disclosed herein, and the alternative embodiments described above, but also alternative embodiments in which certain components may be omitted. In alternative embodiments, the gasket 40 may be omitted, with the vessel-adapter plate 20 and the adapter plate 50 being in direct contact, or with an alternative form of seal disposed therebetween. In other alternative embodiments, the vessel-adapter plate 20 and the gasket 40 may be omitted, with the adapter plate 50 being attached directly to the vessel wall 300, and with an O-ring 30 (or other suitable O-ring or seal) disposed if needed between the adapter plate 50 and the vessel wall 300.

The present invention also includes methods of installing and using the dynamic rotary shaft seal 10 within the scope of the description above, including embodiments wherein steps may be omitted—for example, where a component has been omitted and so is not assembled.

It will be appreciated by those skilled in the art that various modifications and alterations could be made to the disclosure above without departing from the broad inventive concepts thereof. It is understood, therefore, that this invention is not limited to the particular embodiments disclosed, but it is intended to cover modifications within the spirit and scope of the present invention.

We claim:

1. A seal for sealing a gap between rotatable shaft and a vessel wall where the rotatable shaft penetrates the vessel wall, the rotatable shaft having a central axis, the seal comprising:

an adapter plate adapted to be non-rotatably fixed with respect to the vessel wall, the adapter plate having a forward face oriented toward the vessel wall, a rearward face opposite the forward face, and a central bore alignable with the rotatable shaft;

a stator plate with a central bore, a forward face, and a rearward face, the stator plate being disposed rearwardly with respect to the adapter plate;

an adapter-stator sealing member disposed between the adapter plate and the stator plate, the adapter-stator sealing member being non-rotatably attached with respect to the adapter plate;

an interfacing boot, the interfacing boot having a central bore alignable with the rotatable shaft, the interfacing boot being non-rotatably fixable with respect to the rotatable shaft to rotate therewith, the interfacing boot being disposed rearwardly with respect to the stator plate and having a forward face, a rearward face, and a lip extending circumferentially about the forward face of the interfacing boot, the lip encircling the central bore and protruding forwardly from the forward face of the interfacing boot, the lip being in sliding contact with the stator plate when the rotatable shaft rotates, and the lip being configured so that the lip may be displaced by an axial misalignment of the rotatable shaft while the lip maintains contact with the stator plate;

a central boot having a forward face, a rearward face, and a central bore and sealingly engaged with the rotatable shaft and being non-rotatably fixable to the rotatable shaft to prevent relative rotation with respect thereto, a drive ring having a forward face, a rearward face, and a central bore and being non-rotatably fixable with respect to the rotatable shaft to prevent relative rotation with respect thereto, the drive ring having configured to urge the interfacing boot forwardly when the drive ring is urged forwardly;

an anchor ring having a forward face, a rearward face, and a central bore and being non-rotatably fixable with respect to the rotatable shaft to prevent relative rotation with respect thereto, the anchor ring being configured to be selectively axially movable and selectively axially fixable with respect to the rotatable shaft, the anchor ring being non-rotatably fixed to and selectively axially movable with respect to the drive ring;

a bias member configured to urge the anchor ring and the drive ring axially apart; and a compression member configured to be secured to compress the bias member and configured to be released so that the bias member urges the drive ring forwardly with respect to the anchor ring.

2. The seal according to claim 1, further comprising a vessel-adapter plate adapted to be non-rotatably fixed to the vessel wall between the vessel wall and the adapter plate and sealed with respect to the vessel wall, the vessel-adapter plate having a central bore alignable with the rotatable shaft.

3. The seal according to claim 2, further comprising a gasket disposed between the rearward face of the vessel-adapter plate and forward face of the adapter plate, the gasket having a central bore aligned with the central bore of the vessel-adapter plate.

4. The seal according to claim 1, wherein the stator plate is non-rotatably fixed to the adapter plate by stator pins passing slidably though corresponding apertures of the stator plate, with the stator pins engaging compatible apertures in the adapter plate.

5. The seal according to claim 1, wherein the stator plate is non-rotatably fixed to the adapter plate by stator pins passing slidably though corresponding apertures of the stator plate, with the stator pins engaging compatible apertures in the adapter plate, so that upon the axial misalignment of the rotatable shaft during rotation of the rotatable shaft, the stator plate and the adapter plate remain non-rotatably fixed to one another and while allowing for at least one of axial movement, shifting, angular misalignment, or tilting of the stator plate with respect to the adapter plate.

6. The seal according to claim 1, wherein the central boot is configured to have a radial interference fit with respect to the rotatable shaft.

7. The seal according to claim 1, wherein:
the anchor ring has a plurality of radially oriented apertures and is non-rotatably fixable with respect to the rotatable shaft by a plurality of set screws adapted to engage the plurality of radially oriented apertures and the rotatable shaft;
the bias member comprises a spring having a forward end engaging the drive ring and a rearward end engaging the anchor ring, wherein the bias member is compressible and a restoring force of the bias member urges the drive ring and the anchor ring apart from one another; and
the compression member comprises a bolt with a first end having a driver fitting and engaged with a bolt hole of the drive ring and a second end passing through the anchor ring and secured to the anchor ring by a nut such that tightening the nut urges the anchor ring and the drive ring closer together.

8. The seal according to claim 1, further comprising at least one of the following:
a first partial plate and a second partial plate secured to one another to form the adapter plate;
a first partial plate and a second partial plate secured to one another to form the stator plate;
a first partial plate and a second partial plate secured to one another to form the interfacing boot;
a first partial plate and a second partial plate secured to one another to form the drive ring; or
a first partial plate and a second partial plate secured to one another to form the anchor ring is formed.

9. The seal according to claim 2, wherein the vessel-adapter plate has first mounting apertures for securing the vessel-adapter plate to the vessel wall and second mounting apertures for securing the vessel-adapter plate to at least one of the adapter plate or the stator plate.

10. The seal according to claim 2, wherein a forward face of the vessel-adapter plate has a seat accommodating an vessel-adapter sealing member.

11. The seal according to claim 10, wherein the adapter-stator sealing member is an O-ring and the vessel-adapter sealing member is an O-ring.

12. The seal according to claim 1, wherein:
the interfacing boot has a first radial wall extending into the central bore thereof, the first radial wall being configured to prevent the central boot from passing forwardly with respect to the first radial wall;
the drive ring has a second radial wall extending from the drive ring into the central bore thereof, the second radial wall being configured to prevent the central boot from passing rearwardly with respect to the second radial wall;
the forward face of the central boot is disposed rearwardly with respect to the first radial wall, the central boot has a plurality of first engagement features for engaging corresponding second engagement features of the interfacing boot, the first engagement features and the second engagement features being configured to engage and thereby prevent relative rotation between the interfacing boot and the central boot while allowing relative axial movement between the interfacing boot and the central boot, the central boot being configured so that the first radial wall prevents the central boot from passing axially forwardly through the interfacing boot when the central boot moves axially with respect to the interfacing boot; and
the rearward face of the drive ring is disposed rearwardly with respect to the rearward face of the central boot, the drive ring having third engagement features configured to engage the drive ring non-rotatably with respect to the central boot, and second radial wall is configured to bear against the central boot to urge the central boot and the interfacing boot forwardly when the drive ring is urged axially forwardly.

13. The seal according to claim 12, wherein:
the central boot is configured to have a radial interference fit with respect to the rotatable shaft, and the first engagement features of the central boot comprise lugs adapted to engage the second engagement features of the interfacing boot, the second engagement features comprising indents adapted to engage the lugs of the central boot, the lugs and the indents being configured to engage and thereby prevent relative rotation between the interfacing boot and the central boot, while allowing relative axial movement between the interfacing boot and the central boot; and
the third engagement features of the drive ring comprise indents configured to engage the lugs of the central boot to prevent relative rotation between the drive ring and the central boot while allowing relative axial movement between the drive ring and the central boot.

14. The seal according to claim 1, wherein the lip has a forward surface and the forward surface is smaller radially than the stator plate so that the lip may be displaced by an axial misalignment of the rotatable shaft while the lip maintains contact with the stator plate.

15. A method for installing a seal for sealing a gap between rotatable shaft and a vessel wall where the rotatable shaft penetrates the vessel wall, the method comprising:
fixing an adapter plate non-rotatably with respect to the vessel wall, the adapter plate having a forward face oriented toward the vessel wall, a rearward face opposite the forward face, and a central bore alignable with the rotatable shaft;
placing a stator plate with a central bore, a forward face, and a rearward face, the stator plate being placed rearwardly with respect to the adapter plate and mounting an adapter-stator sealing member between the rearward face of the adapter plate and the forward face of the stator plate;
non-rotatably fixing an interfacing boot with respect to the rotatable shaft to rotate therewith, the interfacing boot having a central bore aligned with the rotatable shaft, the interfacing boot being disposed rearwardly with respect to the stator plate and having a forward face, a rearward face, and a lip extending circumferentially about the forward face of the interfacing boot, the lip encircling the central bore and protruding forwardly from the forward face of the interfacing boot, the lip being in sliding contact with the stator plate when the rotatable shaft rotates, and the lip configured so that the lip may be displaced by an axial misalignment of the rotatable shaft while the lip maintains contact with the stator plate;

non-rotatably attaching a central boot with respect to the rotatable shaft to rotate therewith, the central boot having a forward face, a rearward face, and a central bore;

attaching a drive ring to be axially movable and non-rotatable with respect to the rotatable shaft, the drive ring having a forward face, a rearward face, and a central bore, the rearward face of the drive ring being disposed rearwardly with respect to the rearward face of the central boot, and placing the drive ring so that third engagement features thereof, the third engagement features being configured to engage the drive ring non-rotatably with respect to the central boot, engage the second engaging features of the interfacing boot; the drive ring configured to bear urge the central boot forwardly when the drive ring is urged axially forwardly;

attaching an anchor ring having a forward face, a rearward face, and a central bore to be non-rotatably fixed and axially movable with respect to the drive ring;

operatively securing a bias member with respect to the anchor ring and the drive ring to urge the anchor ring and the drive ring axially apart;

securing a compression member to compress the bias member so that upon release of the compression member, the bias member urges the drive ring and the anchor ring away from each other;

placing the anchor ring and the drive ring on the rotatable shaft with the drive ring engaged with the central boot; and securing the anchor ring to be axially and non-rotatably fixed with respect to the rotatable shaft to prevent axial movement and relative rotation with respect to the rotatable shaft, and then releasing the compression member so that the compression member urges the drive ring forwardly with respect to the anchor ring.

16. The method according to claim 15, further comprising:

fixing a vessel-adapter plate non-rotatably and axially to the vessel wall and sealed with respect thereto, the vessel-adapter plate having a central bore aligned with the rotatable shaft; and placing a gasket rearwardly with respect to the vessel-adapter plate, the gasket having a central bore aligned with the central bore of the vessel-adapter plate.

17. The method according to claim 15, wherein the stator plate is non-rotatably fixed to the adapter plate by stator pins passing slidably though corresponding apertures of the stator plate, with the stator pins engaging compatible apertures in the adapter plate.

18. The method according to claim 15, wherein the stator plate is non-rotatably fixed to the adapter plate by stator pins passing slidably though corresponding apertures of the stator plate, with the stator pins engaging compatible apertures in the adapter plate, so that upon the axial misalignment of the rotatable shaft during rotation of the rotatable shaft, the stator plate and the adapter plate remain non-rotatably fixed to one another and while allowing for at least one of axial movement, shifting, angular misalignment, or tilting of the stator plate with respect to the adapter plate.

19. The method according to claim 15, wherein:

the central boot is configured to have a radial interference fit with respect to the rotatable shaft, and the first engagement features of the central boot comprise lugs adapted to engage the second engagement features of the interfacing boot, the second engagement features comprising indents adapted to engage the lugs of the central boot, the lugs and the indents being configured to engage and thereby prevent relative rotation between the interfacing boot and the central boot, while allowing relative axial movement between the interfacing boot and the central boot; and the third engagement features of the drive ring comprise indents configured to engage the lugs of the central boot to prevent relative rotation between the drive ring and the central boot while allowing relative axial movement between the drive ring and the central boot.

20. The method according to claim 15, wherein:

the anchor ring has a plurality of radially oriented apertures and is non-rotatably fixable with respect to the rotatable shaft by a plurality of set screws adapted to engage the plurality of radially oriented apertures and the rotatable shaft;

the bias member comprises a spring having a forward end engaging the drive ring and a rearward end engaging the anchor ring, wherein the bias member is compressible and a restoring force of the bias member urges the drive ring and the anchor ring apart from one another; and the compression member comprises a bolt with a forward end having a driver fitting and engaged with a bolt hole of the drive ring and a rearward end passing through the anchor ring and secured to the anchor ring by a nut such that tightening the nut urges the anchor ring and the drive ring closer together.

21. The method according to claim 15, wherein the seal comprises at least one of the following:

a first partial plate and a second partial plate secured to one another to form the adapter plate;

a first partial plate and a second partial plate secured to one another to form the stator plate;

a first partial plate and a second partial plate secured to one another to form the interfacing boot;

a first partial plate and a second partial plate secured to one another to form the drive ring; or a first partial plate and a second partial plate secured to one another to form the anchor ring is formed.

22. The method according to claim 15, wherein the vessel-adapter plate has a seat accommodating an vessel-adapter sealing member disposed between the vessel-adapter plate and the vessel wall.

23. The method according to claim 22, wherein the vessel-adapter sealing member is an O-ring and the adapter-stator sealing member is an O-ring.

24. A seal for sealing a gap between rotatable shaft and a vessel wall where the rotatable shaft penetrates the vessel wall, the seal comprising:

an adapter plate adapted to be non-rotatably fixed with respect to the vessel wall, the adapter plate having a forward face oriented toward the vessel wall, a rearward face opposite the forward face, and a central bore alignable with the rotatable shaft;

an adapter-stator sealing member mounted to protrude rearwardly from the rearward face of the adapter plate;

a stator plate with a central bore, a forward face, and a rearward face, the stator plate being disposed rearwardly with respect to the adapter plate, the stator plate being in contact with the adapter-stator sealing member protruding from the rearward face of the adapter plate, and the stator plate being non-rotatably attached with respect to the adapter plate and attached in a manner permitting the stator plate to tilt angularly with respect to the adapter plate;

an interfacing boot, the interfacing boot having a central bore alignable with and fittable to the rotatable shaft, the interfacing boot being non-rotatably fixable with respect to the rotatable shaft to rotate therewith, the interfacing boot being disposed rearwardly with respect to the stator plate and having a forward face, a rearward face, and a lip extending circumferentially about the forward face of the interfacing boot, the lip encircling the central bore and protruding forwardly from the forward face of the interfacing boot, the lip being in sliding contact with the stator plate when the rotatable shaft rotates, and the lip having a forward surface and the forward surface being smaller radially than the stator plate so that the lip may be displaced by an axial misalignment of the rotatable shaft while the lip maintains contact with the stator plate, and a radial wall extending into the central bore;

a central boot having a forward face, a rearward face, and a central bore and being non-rotatably fixable to the rotatable shaft to prevent relative rotation with respect thereto, the forward face of the central boot being disposed rearwardly with respect to the radial wall of the interfacing boot, the central boot having a plurality of first engagement features for engaging corresponding second engagement features of the interfacing boot, the first engagement features and the second engagement features being configured to engage and thereby prevent relative rotation between the interfacing boot and the central boot while allowing relative axial movement between the interfacing boot and the central boot, the central boot being configured so that the radial wall of the interfacing boot prevents the central boot from passing axially forwardly through the interfacing boot when the central boot moves axially with respect to the interfacing boot;

a drive ring having a forward face, a rearward face, and a central bore and being non-rotatably fixable with respect to the rotatable shaft to prevent relative rotation with respect thereto, the rearward face of the drive ring being disposed rearwardly with respect to the rearward face of the central boot, the drive ring having third engagement features configured to engage the drive ring non-rotatably with respect to the central boot, and the drive ring having a radial wall configured to bear against the central boot to urge the central boot forwardly when the drive ring is urged axially forwardly;

an anchor ring having a forward face, a rearward face, and a central bore and being non-rotatably fixable with respect to the rotatable shaft to prevent relative rotation with respect thereto, the anchor ring being configured to be selectively axially movable and selectively axially fixable with respect to the rotatable shaft, the anchor ring further being non-rotatably fixed and axially movable with respect to the drive ring;

a bias member configured to urge the anchor ring and the drive ring axially apart; and a compression member configured to be secured to compress the bias member and configured to be released so that the bias member urges the drive ring forwardly with respect to the anchor ring.

* * * * *